United States Patent
Nakatsukasa et al.

(10) Patent No.: US 11,726,771 B2
(45) Date of Patent: Aug. 15, 2023

(54) UPDATE CONTROL DEVICE, UPDATE CONTROL SYSTEM, AND UPDATE CONTROL METHOD

(71) Applicant: Mitsubishi Electric Corporation, Tokyo (JP)

(72) Inventors: Masahiro Nakatsukasa, Tokyo (JP); Ryo Mizobe, Kobe (JP)

(73) Assignee: Mitsubishi Electric Corporation, Tokyo (JP)

( * ) Notice: Subject to any disclaimer, the term of this patent is extended or adjusted under 35 U.S.C. 154(b) by 290 days.

(21) Appl. No.: 17/253,709

(22) PCT Filed: Jun. 29, 2018

(86) PCT No.: PCT/JP2018/024899
§ 371 (c)(1),
(2) Date: Dec. 18, 2020

(87) PCT Pub. No.: WO2020/003515
PCT Pub. Date: Jan. 2, 2020

(65) Prior Publication Data
US 2021/0349709 A1  Nov. 11, 2021

(51) Int. Cl.
*G06F 9/44* (2018.01)
*G06F 8/656* (2018.01)
*G06F 8/41* (2018.01)

(52) U.S. Cl.
CPC .............. *G06F 8/656* (2018.02); *G06F 8/433* (2013.01)

(58) Field of Classification Search
None
See application file for complete search history.

(56) References Cited

U.S. PATENT DOCUMENTS

| | | | |
|---|---|---|---|
| 2002/0019877 A1* | 2/2002 | Wrede | G06F 8/61 701/2 |
| 2013/0132939 A1* | 5/2013 | Murata | G06F 8/65 717/173 |
| 2015/0309784 A1* | 10/2015 | Molin | F01N 9/002 701/1 |
| 2019/0114162 A1 | 4/2019 | Izumi | |
| 2019/0129710 A1 | 5/2019 | Izumi | |
| 2019/0286454 A1* | 9/2019 | Sano | B60R 16/0231 |

FOREIGN PATENT DOCUMENTS

| | | |
|---|---|---|
| DE | 100 38 096 A1 | 2/2002 |
| DE | 10 2016 201 279 A1 | 8/2017 |
| DE | 10 2017 117 052 A1 | 2/2018 |
| JP | 2017-215888 A | 12/2017 |
| WO | 2018/079006 A1 | 5/2018 |

OTHER PUBLICATIONS

Communication dated Sep. 6, 2021 from the German Patent Office in German Application No. 11 2018 007 680.6.
Chinese Office Action dated May 5, 2023 in Chinese Application No. 201880094900.3.

* cited by examiner

*Primary Examiner* — Anna C Deng
(74) *Attorney, Agent, or Firm* — Sughrue Mion, PLLC; Richard C. Turner

(57) ABSTRACT

An update control device determines whether or not an update of an update target ECU is to be completed within stop time from when a vehicle temporarily stops until the vehicle starts traveling, when a response indicating that the update can be executed is given from an in-vehicle ECU having dependency with the update target in-vehicle ECU.

11 Claims, 14 Drawing Sheets

FIG. 7

| Update Target | Dependency (1) | Dependency (2) | Dependency (3) |
|---|---|---|---|
| ECU3a | ECU3c<br>IP : 192.168.xx.xxx<br>Port: 50xxx | - | - |
| ECU3b | ECU3c<br>IP : 192.168.xx.xxx<br>Port: 50xxx | ECU3d<br>IP : 192.168.yy.yyy<br>Port: 50yy | - |
| ECU3c | ECU3a<br>IP : 192.168.ww.www<br>Port: 50www | ECU3b<br>IP : 192.168.zz.zzz<br>Port: 50zz | ECU3d<br>IP : 192.168.yy.yyy<br>Port: 50yy |
| ECU3d | ECU3b<br>IP : 192.168.zz.zzz<br>Port: 50zz | ECU3c<br>IP : 192.168.xx.xxx<br>Port: 50xxx | - |
| ... | ... | ... | ... |

FIG. 9

| Update Target | Startup Time (ms) | ROM Writing Speed (ms/byte) | End Time (ms) | The Number of Times of Startup and The Number of Times of End (Times) | Spare Time (ms) |
|---|---|---|---|---|---|
| ECU3a | 100 | 0.001 | 500 | 1 | 2000 |
| ECU3b | 1000 | 0.002 | 600 | 2 | 2000 |
| ECU3c | 5000 | 0.004 | 1500 | 1 | 5000 |
| ECU3d | 500 | 0.004 | 600 | 1 | 2000 |
| - | - | - | - | - | - |
| - | - | - | - | - | - |
| - | - | - | - | - | - |

~h

UPDATE CONTROL DEVICE, UPDATE CONTROL SYSTEM, AND UPDATE CONTROL METHOD

CROSS REFERENCE TO RELATED APPLICATIONS

This application is a National Stage of International Application No. PCT/JP2018/024899, filed Jun. 29, 2018.

TECHNICAL FIELD

The present invention relates to an update control device, an update control system, and an update control method for controlling an update of a control program of an in-vehicle electronic control unit (hereinafter, referred to as an in-vehicle ECU) mounted on a vehicle.

BACKGROUND ART

In recent years, over the air (OTA) technology for updating a control program of an in-vehicle ECU using wireless communication has been proposed. For example, Patent Literature 1 discloses a control device for predicting time during which a vehicle is parked or stopped and updating a program of an in-vehicle ECU using wireless communication during the predicted time.

CITATION LIST

Patent Literatures

Patent Literature 1: JP 2017-215888 A

SUMMARY OF INVENTION

Technical Problem

In the control device disclosed in Patent Literature 1, an update program is written in an in-vehicle device in a time period in which a vehicle is parked and an engine is stopped. For this reason, when there is an urgent update that needs to be dealt with immediately, it is necessary to interrupt traveling of a vehicle and to park the vehicle temporarily, which is bothersome for a driver and impairs convenience of OTA disadvantageously.

The present invention solves the above problems, and an object of the present invention is to obtain an update control device, an update control system, and an update control method capable of updating an in-vehicle ECU without intentionally parking a vehicle.

Solution To Problem

The update control device according to the present invention includes: a processor to execute a program; and a memory to store the program which, when executed by the processor, performs processes of, inquiring of an in-vehicle electronic control unit (ECU) having dependency with an update target in-vehicle electronic control unit whether or not an update of the update target in-vehicle electronic control unit can be executed; calculating an update time required for updating the update target in-vehicle electronic control unit acquiring a stop time from when a vehicle temporarily stops until the vehicle starts traveling; and determining whether or not the update of the update target in-vehicle electronic control unit is to be completed within the stop time by comparing the update time with the stop time when a response indicating that the update can be executed is confirmed.

Advantageous Effects Of Invention

According to the present invention, when a response indicating that an update can be executed is given from an in-vehicle ECU having dependency with an update target in-vehicle ECU, it is determined whether or not the update of the update target in-vehicle ECU is to be completed within a stop time from when a vehicle temporarily stops until the vehicle starts traveling. As a result, the in-vehicle ECU can be updated within the stop time of the vehicle without intentionally parking the vehicle.

BRIEF DESCRIPTION OF DRAWINGS

FIG. 7 is a diagram illustrating an example of dependency information in the first embodiment.

FIG. 9 is a diagram illustrating an example of time information required for updating an update target ECU in the first embodiment.

DESCRIPTION OF EMBODIMENTS

Hereinafter, in order to describe the present invention in more detail, embodiments for carrying out the present invention will be described with reference to the attached drawings.

First Embodiment

Figure 1:
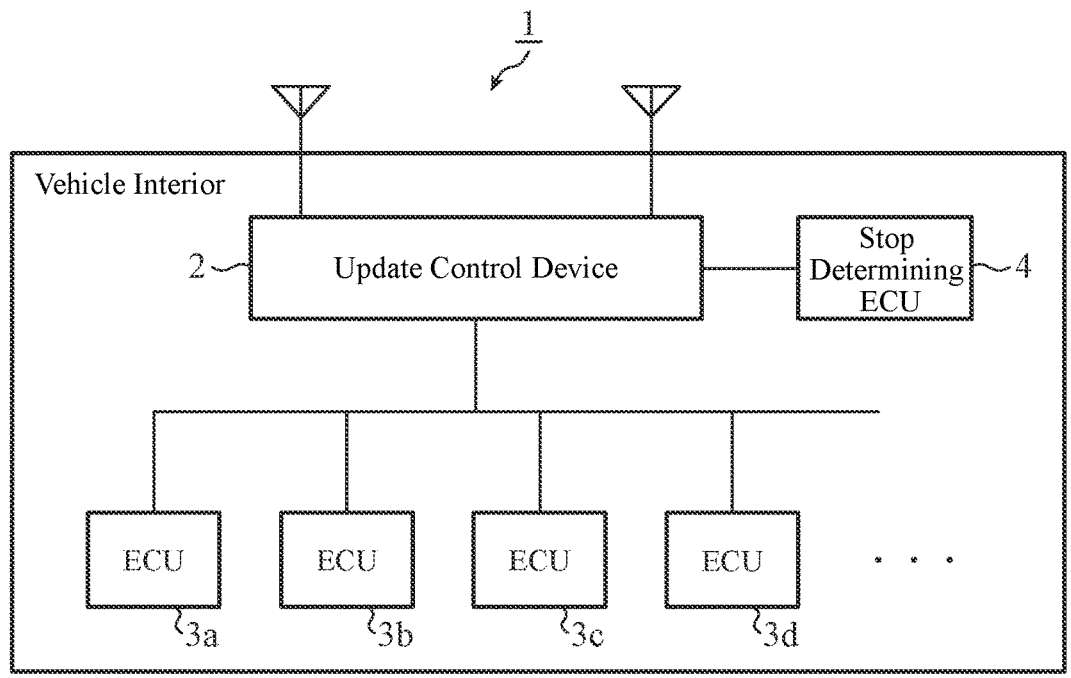
FIG. 1 is a block diagram illustrating a configuration of an update control system according to a first embodiment of the present invention.

FIG. 1 is a block diagram illustrating a configuration of an update control system 1 according to a first embodiment of the present invention. The update control system 1 is a system for controlling an update of an update target ECU among ECUs 3a to 3d (in-vehicle electronic control units) mounted on a vehicle, and includes an update control device 2 and a stop determining ECU in addition to the ECUs 3a to 3d. The update control device 2 receives update data for an update target ECU by wireless communication while a vehicle is traveling, and updates the update target ECU within stop time from when the vehicle temporarily stops due to turning on of a red signal of a traffic light or descent of a crossing gate at a railroad crossing until the vehicle starts traveling. The update data is update data for firmware or software included in the in-vehicle ECU. As an update method, full image update or differential image update is used.

The update control device 2 has a function of performing wired communication and wireless communication, and has a gateway function for connection to a different network. Here, the wireless communication includes data mobile communication such as LTE or 3G, WiFi, Bluetooth (registered trademark), road-to-vehicle communication, and vehicle-to-vehicle communication. Examples of the wired communication include Ethernet (registered trademark), controller area network (CAN), media oriented systems transport (MOST), and local interconnect network (LIN).

The ECUs 3a to 3d are electronic control units for controlling various in-vehicle devices mounted on a vehicle. For example, the ECU 3a is an ECU for implementing a control system of an accelerator operation, a brake operation, a steering wheel operation, vehicle interior lighting, and headlights, and the ECU 3b is an ECU for implementing an advanced driver assistance system (ADAS) using a vehicle exterior camera, a vehicle interior camera, and a corner sensor.

The update control device 2 inquires of an ECU having dependency with an update target ECU whether or not an update can be executed. When a response indicating that the update can be executed is confirmed, the update control device 2 determines whether or not the update of the update target ECU is to be completed within the stop time by comparing update time required for completing the update with the stop time. Here, dependency between ECUs is a relationship in which the ECUs communicate with each other, and one ECU performs an arithmetic process using information received from the other ECU.

For example, when the ECU 3c is an ECU for calculating a vehicle speed and the ECU 3d is an ECU for correcting a current position of a vehicle using the vehicle speed, there is dependency between the ECU 3c and the ECU 3d. In this case, the ECU 3d corrects the current position of the vehicle using the vehicle speed received from the ECU 3c. Therefore, when transmission of a signal of the vehicle speed from the ECU 3c is interrupted, it may be erroneously recognized that the ECU 3d is in an emergency situation in which a communication line with the ECU 3c is broken.

When firmware or software included in an ECU is updated, it is necessary to reset the ECU (stop and restart operation) in order to enable an updated program, and thus it is necessary to interrupt communication that has been performed with another ECU before the update. Therefore, the update control device 2 inquires of an ECU having dependency with an update target ECU whether or not an update can be executed, and updates the update target ECU when a response indicating that the update can be executed is given. Note that when the update target ECU is updated, communication with an ECU having dependency with the update target ECU is shut down. Therefore, for the ECU having dependency, the inquiry about whether or not the update of the update target ECU can be executed can be regarded as an inquiry about whether or not the update target ECU can be shut down.

By monitoring a traffic light or a railroad crossing in front of a vehicle and a vehicle speed, the stop determining ECU 4 determines whether or not the vehicle has stopped due to turning on of a red signal of the traffic light or descent of a crossing gate at the railroad crossing.

For example, by controlling a vehicle exterior camera, recognizing a light color of the traffic light or a state of the crossing gate at the railroad crossing from an image capturing an area in front of the vehicle, and recognizing the vehicle speed from a vehicle speed sensor or a brake operation, the stop determining ECU 4 determines whether or not the vehicle has stopped due to turning on of a red signal of the traffic light or descent of the crossing gate at the railroad crossing. When the stop determining ECU 4 determines that the vehicle has stopped, the stop determining ECU 4 transmits a stop state notification indicating this determination result to the update control device 2 using in-vehicle communication.

Figure 2:
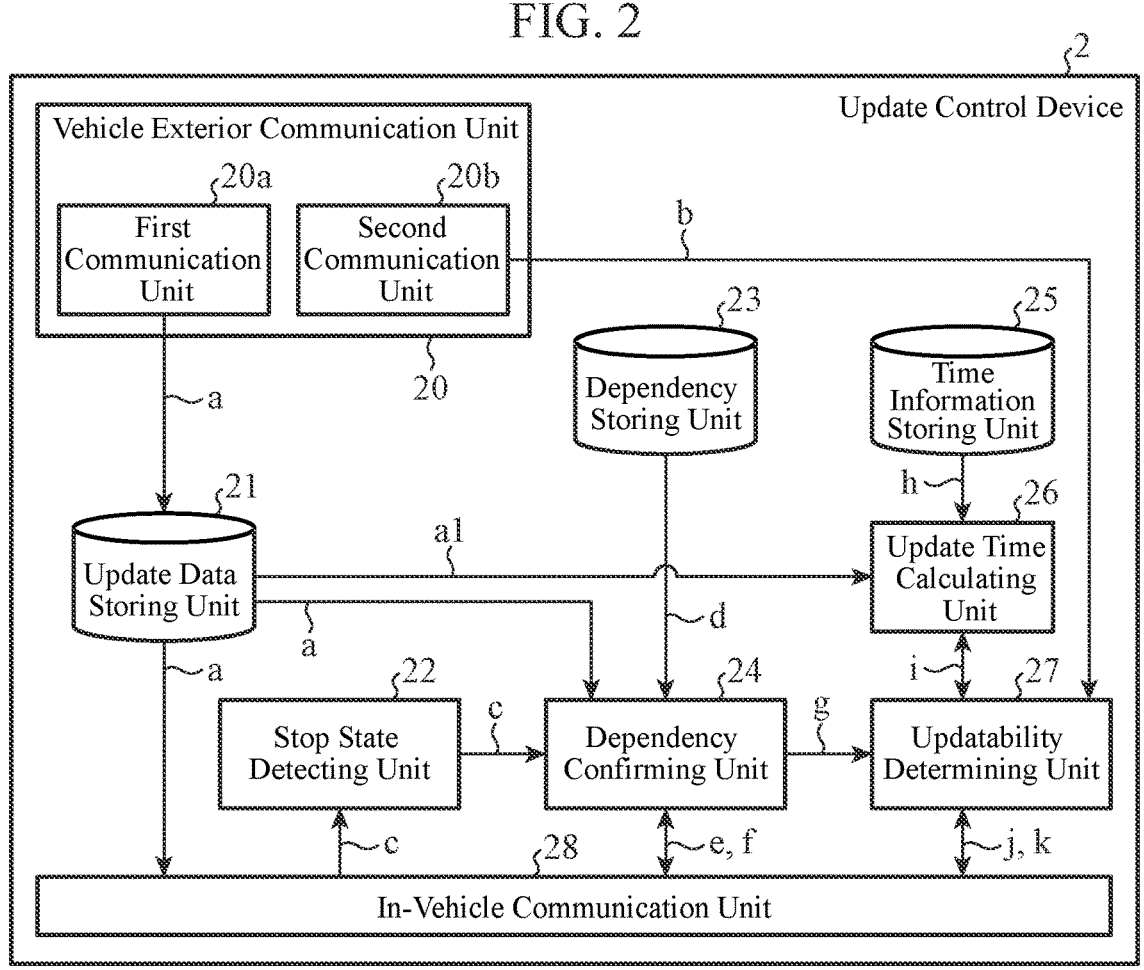
FIG. 2 is a block diagram illustrating a configuration of an update control device according to the first embodiment.

FIG. 2 is a block diagram illustrating a configuration of the update control device 2. In FIG. 2, the update control device 2 includes a vehicle exterior communication unit 20, an update data storing unit 21, a stop state detecting unit 22, a dependency storing unit 23, a dependency confirming unit 24, a time information storing unit 25, an update time calculating unit 26, an updatability determining unit 27, and an in-vehicle communication unit 28. The vehicle exterior communication unit 20 is a communication unit for communicating with an external device by wireless communication, and includes a first communication unit 20a and a second communication unit 20b.

The first communication unit 20a is connected to a wireless network by wireless communication such as LTE or 3G, and acquires update data a from an external device connected to the wireless network. The external device is, for example, a server for managing update data for firmware or software included in an ECU. When the ECU is updated, the server transmits the update data a including information indicating firmware or software as an update target and an update program to the update control device 2. The update control device 2 identifies an update target ECU from among the ECUs 3a to 3d on the basis of the update data a received from the server.

The second communication unit 20b is a stop time acquiring unit for acquiring stop time b of the vehicle using road-to-vehicle communication or vehicle-to-vehicle communication. The stop time b is time from when the vehicle temporarily stops until the vehicle starts traveling. For example, the second communication unit 20b may receive the stop time b from a roadside wireless communication device disposed at a traffic light or a railroad crossing by road-to-vehicle communication. Here, the roadside wireless communication device is an external device for managing time during which a red signal of a traffic light is turned on or time during which a crossing gate at a railroad crossing is descending as the stop time b. Note that when the stop time b is acquired by an in-vehicle device mounted on a preceding vehicle traveling in front of the vehicle, the second communication unit 20b may acquire the stop time b from the in-vehicle device of the preceding vehicle by vehicle-to-vehicle communication.

The update data storing unit 21 is a storage unit for storing the update data a for an update target ECU. The update data a received from the server by the first communication unit 20a is stored in the update data storing unit 21.

The stop state detecting unit 22 detects a stop state of the vehicle on the basis of whether or not a stop state notification c has been received from the stop determining ECU 4. Here, the stop state of the vehicle is a state in which the vehicle temporarily stops due to turning on of a red signal of a traffic light or descent of a crossing gate at a railroad crossing. The stop state detecting unit 22 detects whether or not the vehicle is in the stop state on the basis of the stop state notification c received from the stop determining ECU 4 by the in-vehicle communication unit 28, and when the vehicle is in the stop state, the stop state detecting unit 22 outputs the stop state notification c to the dependency confirming unit 24.

The dependency storing unit 23 stores dependency information d indicating dependency between the ECUs 3a to 3d connected to the update control device 2. The dependency information d is table information in which pieces of information indicating dependency between the ECUs are associated with the respective ECUs. Examples of the information indicating the dependency between the ECUs include a destination address in communication between the ECUs.

The dependency confirming unit 24 inquires of an ECU having dependency with an update target ECU among the ECUs 3a to 3d whether or not an update of the update target ECU can be executed. For example, the dependency confirming unit 24 confirms the update target ECU by referring to the update data a stored in the update data storing unit 21, and confirms a stop state of the vehicle on the basis of the stop state notification c input from the stop state detecting unit 22. The dependency confirming unit 24 identifies an ECU having dependency with the update target ECU on the basis of the dependency information d stored in the dependency storing unit 23. The dependency confirming unit 24 transmits inquiry information e inquiring of the ECU having dependency with the update target ECU whether or not an update of the update target ECU can be executed using the in-vehicle communication unit 28.

The ECU having dependency with the update target ECU transmits response information f with respect to the inquiry information e to the update control device 2. The dependency confirming unit 24 generates response content information g indicating the content of the response information f received by the in-vehicle communication unit 28, and outputs the response content information g to the updatability determining unit 27. The response content information g is used as a condition for determining updatability by the updatability determining unit 27.

The time information storing unit 25 stores pieces of time information h each including startup time, end time, and a memory writing speed of a corresponding ECU connected to the update control device 2, associated with the respective ECUs. Here, when an ECU has an operating system (OS) mounted thereon, the startup time of the ECU and the end time of the ECU include startup time of the OS and the end time of the OS, respectively. The end time also includes communication end time between the ECUs. By referring to the time information h stored in the time information storing unit 25 and data size a1 of the update data a stored in the update data storing unit 21, the update time calculating unit 26 calculates update time i required for updating the update target ECU.

The updatability determining unit 27 determines whether or not an update of the update target ECU is to be completed within the stop time b. For example, when the response content information g input from the dependency confirming unit 24 indicates that the update can be executed, the updatability determining unit 27 determines whether or not the update of the update target ECU is to be completed within the stop time b by comparing the stop time b acquired by the second communication unit 20b with the update time i calculated by the update time calculating unit 26.

The in-vehicle communication unit 28 communicates with each of the ECUs 3a to 3d and the stop determining ECU 4 via wired communication such as CAN. For example, the in-vehicle communication unit 28 transmits the inquiry information e from the dependency confirming unit 24 to an ECU having dependency with the update target ECU, and receives response information f from the ECU. In addition, the in-vehicle communication unit 28 transmits update request j from the updatability determining unit 27 to the update target ECU, and receives update result information k from the update target ECU.

Figure 3:
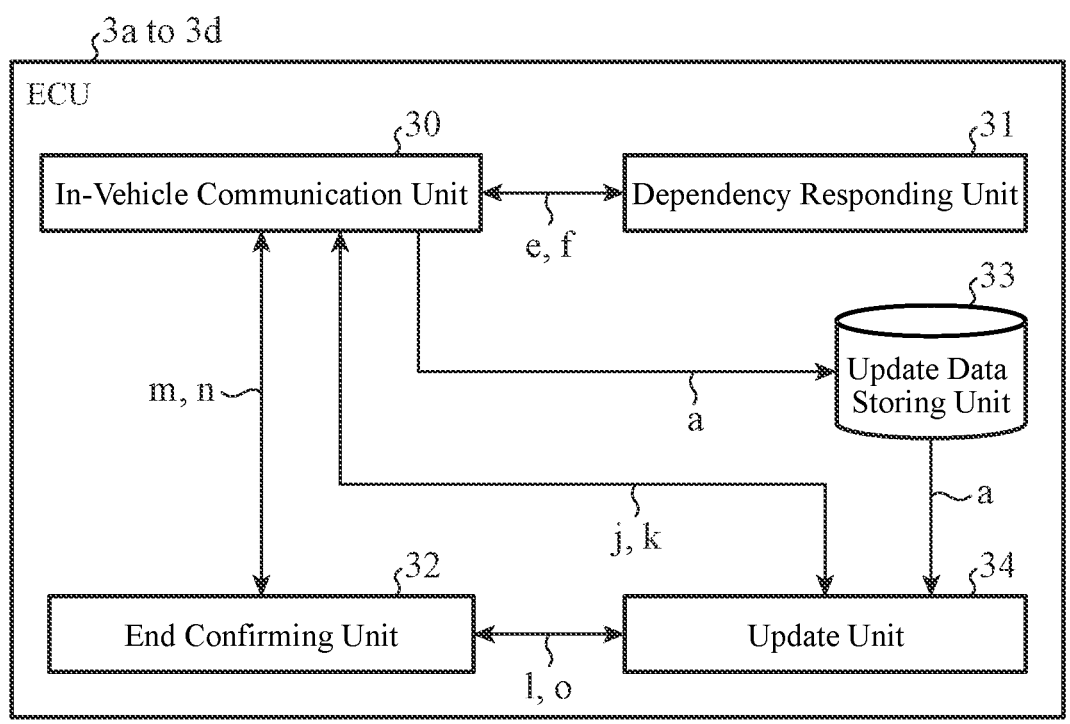
FIG. 3 is a block diagram illustrating a configuration of an in-vehicle ECU according to the first embodiment.

FIG. 3 is a block diagram illustrating a configuration of an in-vehicle ECU, and illustrates functional configurations of the ECUs 3a to 3d illustrated in FIG. 1. As illustrated in FIG. 3, each of the ECUs 3a to 3d includes an in-vehicle communication unit 30, a dependency responding unit 31, an end confirming unit 32, and an update unit 34. The in-vehicle communication unit 30 communicates with another ECU and the update control device 2 via wired communication such as CAN. The dependency responding unit 31 generates response information f for inquiry information e received by the in-vehicle communication unit 30, and transmits the response information f to the update control device 2 using the in-vehicle communication unit 30.

When an ECU on which the end confirming unit 32 is mounted is an update target ECU, the end confirming unit 32 confirms an end of communication with an ECU having dependency. For example, when the end confirming unit 32 receives input of communication end request 1 from the update unit 34, the end confirming unit 32 transmits communication end notification m to the ECU having dependency using the in-vehicle communication unit 30. When an end confirming unit 32 included in the ECU having dependency receives the communication end notification m, the end confirming unit 32 generates response information n indicating whether or not communication with the update target ECU can be ended, and transmits the response information n to the update target ECU using the in-vehicle communication unit 30. The end confirming unit 32 included in the update target ECU receives input of the response information n received by the in-vehicle communication unit 30 thereof and transmitted from the ECU having dependency, and outputs information o indicating the content of the response information n to the update unit 34.

The update data storing unit 33 is a storage unit for storing update data a for an update target ECU. The update data a may be stored in the update data storing unit 33 before an update is started due to the update request j.

The update unit 34 updates firmware or software included in the ECU using the update data a stored in the update data storing unit 33. For example, when the in-vehicle communication unit 30 receives the update request j from the update control device 2 and the update unit 34 obtains the information o indicating that communication with the ECU having dependency can be ended from the end confirming unit 32, the update unit 34 performs an update process using the update data a. The update unit 34 transmits the update result information k indicating a result of the update process to the update control device 2 using the in-vehicle communication unit 30.

Next, a hardware configuration for implementing a function of the update control system 1 will be described.

Functions of the vehicle exterior communication unit 20, the update data storing unit 21, the stop state detecting unit 22, the dependency storing unit 23, the dependency confirming unit 24, the time information storing unit 25, the update time calculating unit 26, the updatability determining unit 27, and the in-vehicle communication unit 28 in the update control device 2 are implemented by a processing circuit. That is to say, the update control device 2 includes a processing circuit for executing processes in steps ST1a to ST8a described later with reference to FIG. 6. The processing circuit may be dedicated hardware or a central processing unit (CPU) for executing a program stored in a memory.

Functions of the in-vehicle communication unit 30, the dependency responding unit 31, the end confirming unit 32, and the update unit 34, which are included in each of the ECUs 3a to 3d, are implemented by a processing circuit. That is to say, each of the ECUs 3a to 3d includes a processing circuit for executing processes in steps ST1b to ST7b described later with reference to FIG. 11. The processing circuit may be dedicated hardware or a CPU for executing a program stored in a memory.

Figure 4:
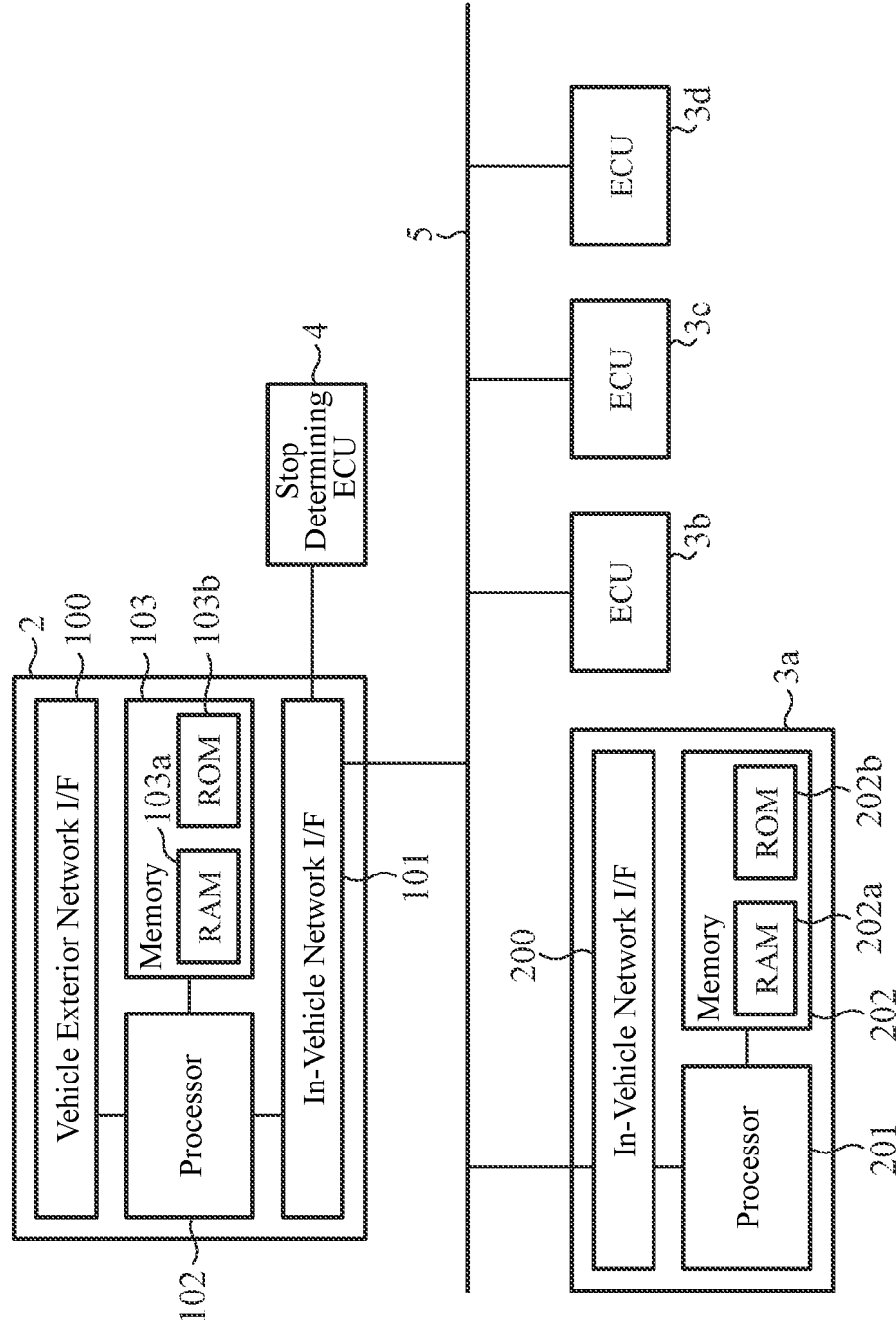
FIG. 4 is a block diagram illustrating a hardware configuration in which software for implementing a function of the update control system according to the first embodiment is executed.

FIG. 4 is a block diagram illustrating a hardware configuration in which software for implementing a function of the update control system 1 is executed. In FIG. 4, the update control device 2 and the ECUs 3a to 3d are connected to each other by a communication bus 5. A vehicle exterior network interface 100 is an interface (hereinafter referred to as I/F) for communication connection with an out-of-vehicle network. For example, the vehicle exterior network I/F 100 is a road-to-vehicle I/F for communicating with a roadside wireless communication device disposed on a roadside near a traffic light or a railroad crossing, and is a wireless communication I/F for communication connection with a communication network such as the Internet. Examples of the wireless communication I/F include I/Fs of LTE, 3G, WiFi, and Bluetooth (registered trademark). Information transmitted and received between the first communication unit 20a and the second communication unit 20b illustrated in FIG. 2 and a device outside a vehicle is relayed by the vehicle exterior network I/F 100.

An in-vehicle network I/F 101 and an in-vehicle network I/F 200 are I/Fs for performing wired communication between ECUs via an in-vehicle network. Examples of the in-vehicle network I/F 101 and the in-vehicle network I/F 200 include I/Fs of CAN, Ethernet (registered trademark), MOST, and LIN. Information transmitted and received between the in-vehicle communication unit 28 illustrated in FIG. 2 and the in-vehicle communication unit 30 illustrated in FIG. 3 is relayed by the in-vehicle network I/F 101 and the in-vehicle network I/F 200.

When the processing circuit for implementing a function of the update control device 2 is dedicated hardware, for example, a single circuit, a composite circuit, a programmed processor, a parallel programmed processor, an application specific integrated circuit (ASIC), a field-programmable gate array (FPGA), or a combination thereof corresponds to the processing circuit. Functions of the vehicle exterior communication unit 20, the update data storing unit 21, the stop state detecting unit 22, the dependency storing unit 23, the dependency confirming unit 24, the time information storing unit 25, the update time calculating unit 26, the updatability determining unit 27, and the in-vehicle communication unit 28 in the update control device 2 may be implemented by separate processing circuits, or these functions may be collectively implemented by one processing circuit.

When the processing circuit for implementing a function of each of the ECUs 3a to 3d is dedicated hardware, for example, a single circuit, a composite circuit, a programmed processor, a parallel programmed processor, an ASIC, an FPGA, or a combination thereof corresponds to the processing circuit. Functions of the in-vehicle communication unit 30, the dependency responding unit 31, the end confirming unit 32, and the update unit 34, which are included in each of the ECUs 3a to 3d, may be implemented by separate processing circuits, or these functions may be collectively implemented by one processing circuit.

When the processing circuit for implementing a function of the update control device 2 is a processor 102 illustrated in FIG. 4, functions of the vehicle exterior communication unit 20, the update data storing unit 21, the stop state detecting unit 22, the dependency storing unit 23, the dependency confirming unit 24, the time information storing unit 25, the update time calculating unit 26, the updatability determining unit 27, and the in-vehicle communication unit 28 in the update control device 2 are implemented by software, firmware, or a combination of software and firmware. Note that the software or the firmware is described as a program and stored in a memory 103.

By reading and executing a program stored in the memory 103, the processor 102 implements functions of the vehicle exterior communication unit 20, the update data storing unit 21, the stop state detecting unit 22, the dependency storing unit 23, the dependency confirming unit 24, the time information storing unit 25, the update time calculating unit 26, the updatability determining unit 27, and the in-vehicle communication unit 28 in the update control device 2. That is to say, the update control device 2 includes the memory 103 for storing a program that causes processes in steps ST1a to ST8a illustrated in FIG. 6 to be executed as a result when the program is executed by the processor 102.

The program causes a computer to execute procedures or methods of the vehicle exterior communication unit 20, the update data storing unit 21, the stop state detecting unit 22, the dependency storing unit 23, the dependency confirming unit 24, the time information storing unit 25, the update time calculating unit 26, the updatability determining unit 27, and the in-vehicle communication unit 28. The memory 103 may be a computer-readable storage medium storing a program for causing a computer to function as the vehicle exterior communication unit 20, the update data storing unit 21, the stop state detecting unit 22, the dependency storing unit 23, the dependency confirming unit 24, the time information storing unit 25, the update time calculating unit 26, the updatability determining unit 27, and the in-vehicle communication unit 28.

When the processing circuit for implementing a function of each of the ECUs 3a to 3d is a processor 201 illustrated in FIG. 4, functions of the in-vehicle communication unit 30, the dependency responding unit 31, the end confirming unit 32, and the update unit 34, which are included in each of the ECUs 3a to 3d, are implemented by software, firmware, or a combination of software and firmware. Note that the software or the firmware is described as a program and stored in a memory 202.

The processor 201 implements functions of the in-vehicle communication unit 30, the dependency responding unit 31, the end confirming unit 32, and the update unit 34, which are included in each of the ECUs 3a to 3d, by reading and executing a program stored in the memory 202. That is to say, each of the ECUs 3a to 3d includes the memory 202 for storing a program that causes processes in steps ST1b to ST11b illustrated in FIG. 11 to be executed as a result when the program is executed by the processor 201.

The program causes a computer to execute procedures or methods of the in-vehicle communication unit 30, the dependency responding unit 31, the end confirming unit 32, and the update unit 34. The memory 202 may be a computer-readable storage medium storing a program for causing a computer to function as the in-vehicle communication unit 30, the dependency responding unit 31, the end confirming unit 32, and the update unit 34.

As the memory 103, a random access memory (RAM) 103a and a read only memory (ROM) 103b are used. The RAM 103a temporarily stores an execution program executed by the processor 102 and data required for executing the program. The ROM 103b stores the execution program. As the memory 103, any one of a nonvolatile or volatile semiconductor memory such as a flash memory, an erasable programmable read only memory (EPROM), or electrically-EPROM (EEPROM), a magnetic disk, a flexible disk, an optical disc, a compact disc, a mini disc, and a DVD may be used.

A RAM 202a and a ROM 202b are used for the memory 202 similarly to the memory 103. The RAM 202a temporarily stores an execution program executed by the processor 201 and data required for executing the program. The ROM 202b stores the execution program and an update target program.

Some of functions of the vehicle exterior communication unit 20, the update data storing unit 21, the stop state detecting unit 22, the dependency storing unit 23, the dependency confirming unit 24, the time information storing unit 25, the update time calculating unit 26, the updatability determining unit 27, and the in-vehicle communication unit 28 in the update control device 2 may be implemented by dedicated hardware, and some of the functions may be implemented by software or firmware.

For example, functions of the vehicle exterior communication unit 20 and the in-vehicle communication unit 28 are implemented by a processing circuit which is dedicated hardware, and functions of the update data storing unit 21, the stop state detecting unit 22, the dependency storing unit 23, the dependency confirming unit 24, the time information storing unit 25, the update time calculating unit 26, and the updatability determining unit 27 are implemented by reading and executing a program stored in the memory 103 with the processor 102. In this way, the processing circuit can implement the above functions by hardware, software, firmware, or a combination thereof. The same applies to the ECUs 3a to 3d.

Next, the operation will be described.

Figure 5:
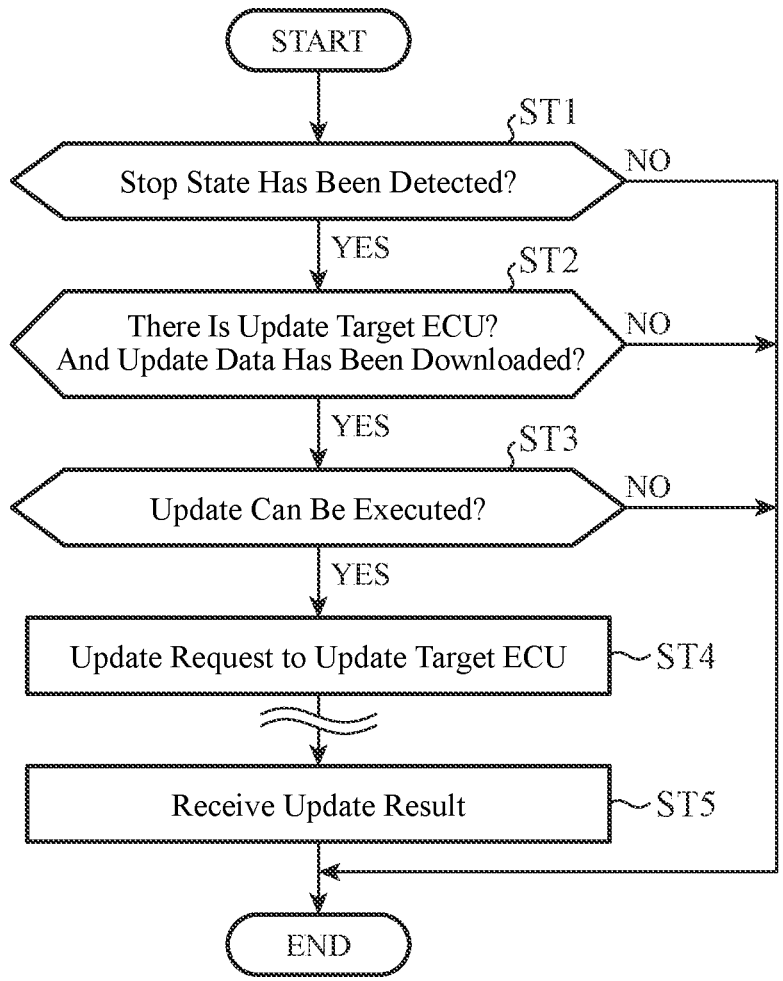
FIG. 5 is a flowchart illustrating operation of the update control system according to the first embodiment.

FIG. 5 is a flowchart illustrating the operation of the update control system 1, and illustrates a case where one of the ECUs 3a to 3d is an update target ECU. It is assumed that a vehicle temporarily stops due to turning on of a red signal of a traffic light or descent of a crossing gate at a railroad crossing before a process of FIG. 5 is executed. At this time, the stop determining ECU 4 determines that the vehicle is in a stop state, and transmits a stop state notification c to the update control device 2.

The stop state detecting unit 22 confirms whether or not the stop state of the vehicle has been detected on the basis of whether or not a stop state notification c has been received from the stop determining ECU 4 (step ST1). Here, if a stop state notification c has not been received and thus the stop state of the vehicle has not been detected (step ST1; NO), the process of FIG. 5 is ended. Note that a series of processes illustrated in FIG. 5 is executed every time the vehicle stops due to a traffic light or the like while the update control device 2 is activated.

If a stop state notification c has been received and thus the stop state of the vehicle has been detected (step ST1; YES), the stop state detecting unit 22 outputs the stop state notification c to the dependency confirming unit 24.

The dependency confirming unit 24 confirms whether or not there is an update target ECU among the ECU 3a to 3d connected to the update control device 2 and update data a has been downloaded (step ST2). For example, by referring to update data a stored in the update data storing unit 21, the dependency confirming unit 24 confirms whether or not there is an update target ECU among the ECU 3a to 3d and update data a has been downloaded to the update data storing unit 21.

If there is no update target ECU among the ECU 3a to 3d or update data a has not been downloaded (step ST2; NO), the process of FIG. 5 is ended.

Note that in the first embodiment, update data a that enables an update process is data that has been downloaded to the update control device 2 while the vehicle is traveling.

Meanwhile, if there is an update target ECU among the ECU 3a to 3d and update data a has been downloaded (step ST2; YES), the dependency confirming unit 24 and the updatability determining unit 27 determine whether or not an update of the update target ECU can be executed (step ST3). Note that the updatability determination will be described in detail with reference to FIG. 6 described later. If the updatability determining unit 27 determines that an update of the update target ECU cannot be executed (step ST3; NO), the process of FIG. 5 is ended.

If the updatability determining unit 27 determines that an update of the update target ECU can be executed (step ST3; YES), the updatability determining unit 27 transmits update request to the update target ECU so as to execute an update (step ST4). The update data a may be stored in the update data storing unit 33 before an update is started due to update request j.

The update target ECU executes a firmware or software update process using the update data a received from the update control device 2. Then, the update target ECU transmits update result information k indicating whether or not an update is successful to the update control device 2 using the in-vehicle communication unit 30.

The in-vehicle communication unit 28 included in the update control device 2 receives the update result information k from the update target ECU (step ST5). When the update result information k indicates that the update is successful, the update of the update target ECU is completed. Meanwhile, when the update result information k indicates that the update fails, the series of processes in FIG. 5 is repeatedly executed until the update of the update target ECU is completed.

Next, details of an updatability determination process will be described.

Figure 6:
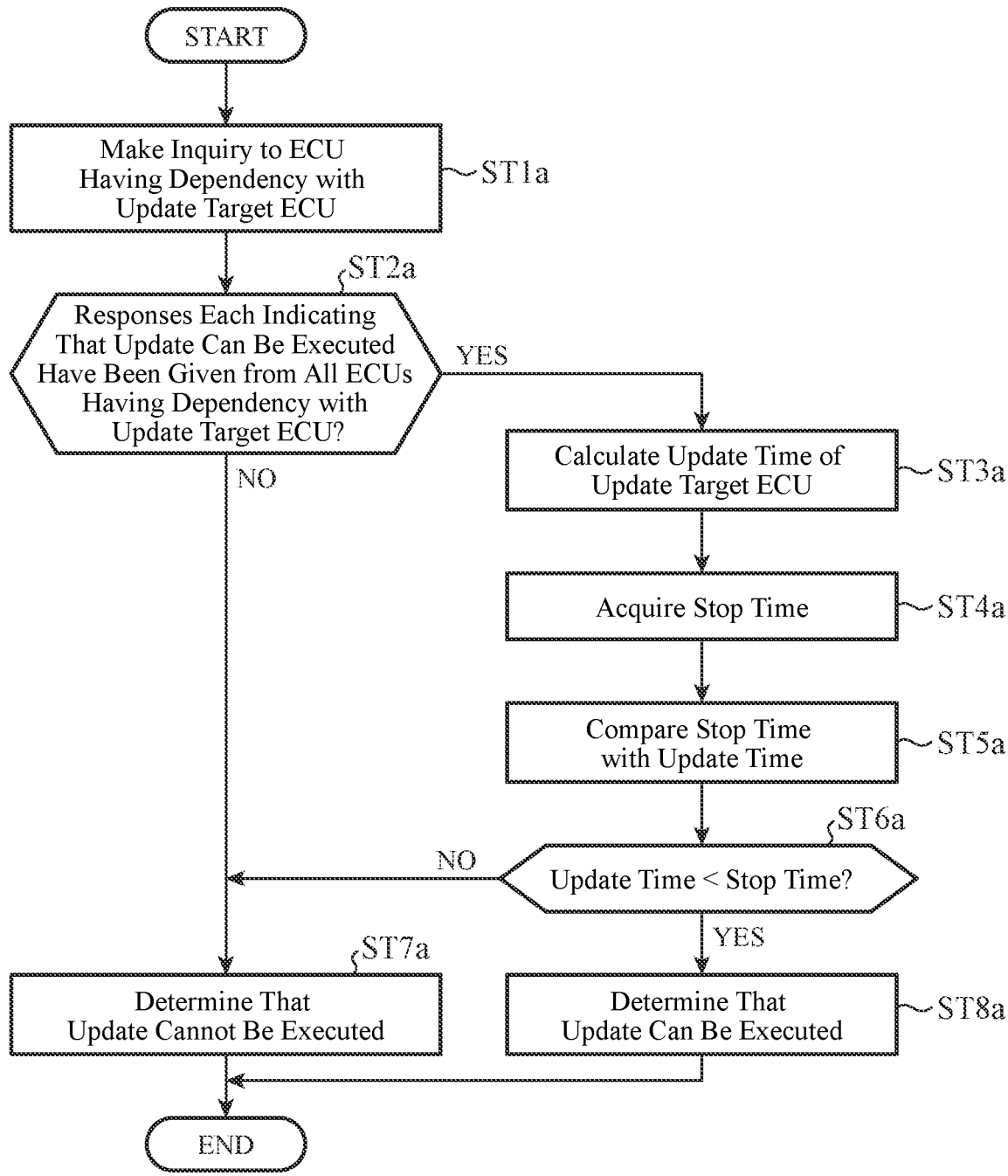
FIG. 6 is a flowchart illustrating an update control method according to the first embodiment.

FIG. 6 is a flowchart illustrating an update control method according to the first embodiment, and illustrates details of step ST3 illustrated in FIG. 5.

First, the dependency confirming unit 24 inquires of an ECU having dependency with the update target ECU whether or not an update of the update target ECU can be executed (step ST1a). For example, the dependency confirming unit 24 identifies all the ECUs having dependency with the update target ECU on the basis of dependency information d stored in the dependency storing unit 23.

FIG. 7 is a diagram illustrating an example of the dependency information d. In dependency information d illustrated in FIG. 7, an address of an ECU in in-vehicle communication between ECUs is set as information indicating dependency with an update target ECU. When the in-vehicle communication is Ethernet (registered trademark), the address of an ECU corresponds to the internet protocol (IP) address and the port number of the ECU. When the in-vehicle communication is CAN, the address of an ECU corresponds to the CAN-ID received by an ECU at a communication connection destination.

For example, when the update target ECU is the ECU 3a, the ECU 3a has dependency (1) for performing in-vehicle communication with the ECU 3c as illustrated in FIG. 7. Meanwhile, when the update target ECU is the ECU 3c, the ECU 3c has three dependencies of dependency (1), dependency (2), and dependency (3). That is to say, the update target ECU 3c has dependency (1) for performing in-vehicle communication with the ECU 3a, dependency (2) for performing in-vehicle communication with the ECU 3b, and dependency (3) for performing in-vehicle communication with the ECU 3d.

For example, when the update target ECU is the ECU 3b, by referring to the dependency information d illustrated in FIG. 7, the dependency confirming unit 24 identifies the ECU 3c and ECU 3d having dependency with the ECU 3b from among the ECU 3a, ECU 3c, and ECU 3d. Subsequently, the dependency confirming unit 24 outputs inquiry information e to the in-vehicle communication unit 28, and thereby transmits the inquiry information e to the ECU 3c and the ECU 3d having dependency with the update target ECU 3b. When a plurality of ECUs is an inquiry target, the in-vehicle communication unit 28 may deliver the inquiry information e by broadcasting.

Figure 8:
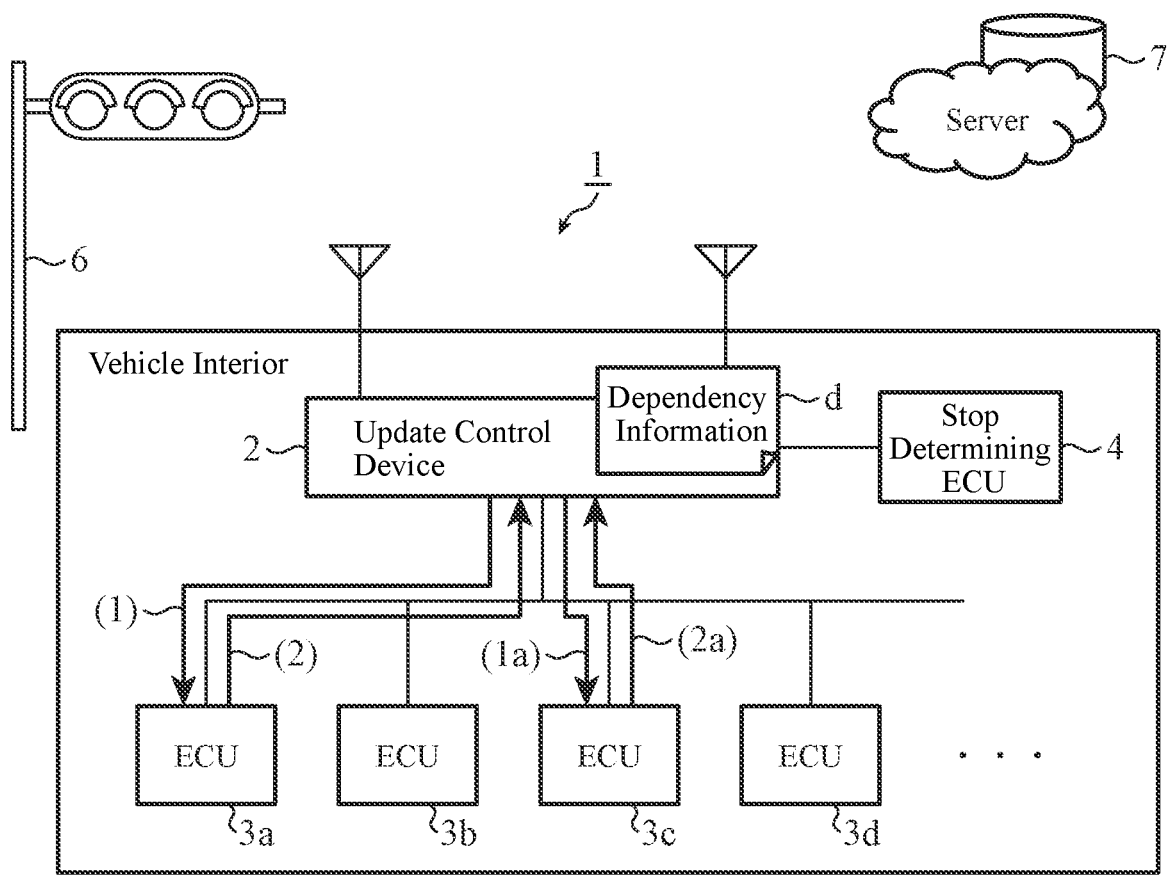
FIG. 8 is an explanatory diagram illustrating a process of confirming dependency of an in-vehicle ECU in the first embodiment.

FIG. 8 is an explanatory diagram illustrating a process of confirming dependency of an ECU in the first embodiment. Description will be made by assuming that the ECU 3a is an update target and the ECU 3c has dependency with the ECU 3a in FIG. 8. In addition, it is assumed that the vehicle temporarily stops due to a red signal of a traffic light 6, and update data a has been downloaded from a server 7 to the update control device 2.

The dependency confirming unit 24 included in the update control device 2 transmits information inquiring whether or not there is a problem in an update to the update target ECU 3a using the in-vehicle communication unit 28 (information communication process (1)). When the above information is received by the in-vehicle communication unit 30, the dependency responding unit 31 included in the update target ECU 3a transmits response information f to the update control device 2 using the in-vehicle communication unit 30 (information communication process (2)).

At this time, the dependency responding unit 31 manages communication between the update target ECU 3a and the ECU 3c having dependency therewith in communication states (A) to (C), and determines the content of the response information f on the basis of a current communication state. The communication state (A) is a state in which the ECU 3a is not communicating. The communication state (B) is a state in which the ECU 3a periodically communicates with the ECU 3c. In the communication state (B), the ECU 3a does not communicate with the ECU 3c except in a communication cycle. In the communication state (C), the ECU 3a and the ECU 3c are currently communicating with each other, and are performing processes using information obtained by the communication. The dependency responding unit 31 included in the update target ECU 3a identifies a state corresponding to a current communication state from among the communication states (A) to (C), and transmits response information f indicating the identified communication state to the update control device 2 using the in-vehicle communication unit 30 (information communication process (2)).

The dependency confirming unit 24 included in the update control device 2 transmits inquiry information e to the ECU 3c having dependency with the update target ECU 3a using the in-vehicle communication unit 28 (information communication process (1a)). When the inquiry information e is received by the in-vehicle communication unit 30, the dependency responding unit 31 included in the ECU 3c transmits response information f to the update control device 2 using the in-vehicle communication unit 30 (information communication process (2a)). At this time, the dependency responding unit 31 included in the ECU 3c manages communication with the update target ECU 3a in the communication states (A) to (C). The dependency responding unit 31 included in the ECU 3c identifies a state corresponding to a current communication state from among the communication states (A) to (C), and transmits response information f indicating the identified communication state to the update control device 2 using the in-vehicle communication unit 30 (information communication process (2a)).

Here, return to the description of FIG. 6.

The dependency confirming unit 24 confirms whether or not responses each indicating that an update can be executed have been given from all the ECUs having dependency with the update target ECU on the basis of the response information f (step ST2a). For example, when a communication state indicated by the response information f is the communication state (A) or the communication state (B), the dependency confirming unit 24 determines that the response information f indicates that an update can be executed, and outputs response content information g indicating that an update can be executed to the updatability determining unit 27. Meanwhile, when the communication state indicated by the response information f is the communication state (C), the dependency confirming unit 24 determines that the response information f indicates that an update cannot be executed, and outputs response content information g indicating that an update cannot be executed to the updatability determining unit 27.

If all the ECUs having dependency with the update target ECU have given responses each indicating that an update can be executed (step ST2a; YES), the updatability determining unit 27 instructs the update time calculating unit 26 to calculate update time i. When receiving the instruction from the updatability determining unit 27, the update time calculating unit 26 calculates the update time i of the update target ECU (step ST3a). For example, by referring to time information h stored in the time information storing unit 25 and data size a1 of update data a stored in the update data storing unit 21, the update time calculating unit 26 calculates the update time i required for updating the update target ECU.

FIG. 9 is a diagram illustrating an example of the time information h in the first embodiment. Time information h illustrated in FIG. 9 is table information in which startup time (milliseconds) of an ECU, a writing speed (milliseconds/byte) of the ROM 202b, end time (milliseconds) of operation of the ECU, the number of times of startup of the ECU and the number of times of end of the ECU (times), and spare time (milliseconds) are associated with the ECU. Note that the ROM 202b stores an execution program and an update program.

The update time calculating unit 26 calculates the update time i in accordance with the following formula (1) using the time information h and the data size a1 of the update data a. Note that, in the following formula (1), A represents startup time of the update target ECU, B represents the number of times of startup of the update target ECU, and C represents a writing speed of the ROM 202b included in the update target ECU. D represents the data size a1 of the update data a. E represents end time of operation of the update target ECU, F represents the number of times of end of the update target ECU, and G represents spare time.

$$\text{Update time (milliseconds)} = (A \times B) + (C \times D) + (E \times F) + G \quad (1)$$

For example, when the update target is the ECU 3a, using the time information h illustrated in FIG. 9 and the data size a1 of the update data a, update time i of the ECU 3a is calculated as follows in accordance with the above formula (1). Note that in the above formula (1), each of startup time A of an ECU and end time E thereof may be average time obtained by repeating startup and end of the ECU several tens of times. The spare time G is time as a margin for surely completing an update of an ECU, and is time during which a recovery to return the program to a previous version or execute the update again can be performed even if the update fails.

Update time (milliseconds) of ECU 3a=100+(0.001×a1)+500+2000

The number B of times of startup of an ECU and the number F of times of end thereof are the number of times of startup and the number of times of end affected by reset of the ECU executed by updating firmware or software included in the ECU, respectively, and vary depending on a configuration of a memory area of the ROM 202b.

Figure 10A:
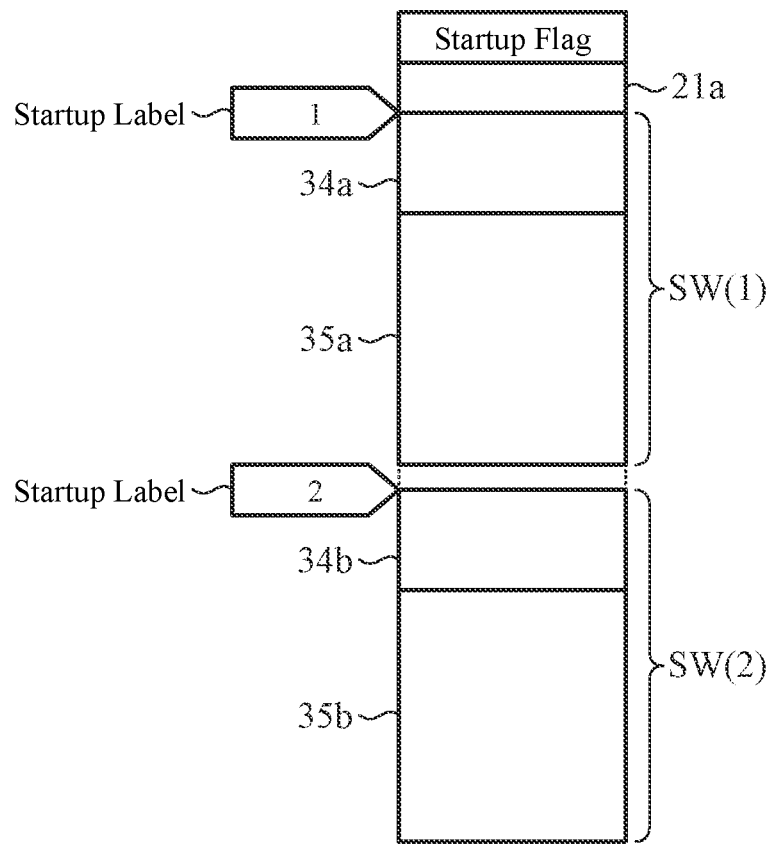
FIG. 10A is a diagram illustrating a configuration of a memory area of a ROM included in an update target ECU.
Figure 10B:
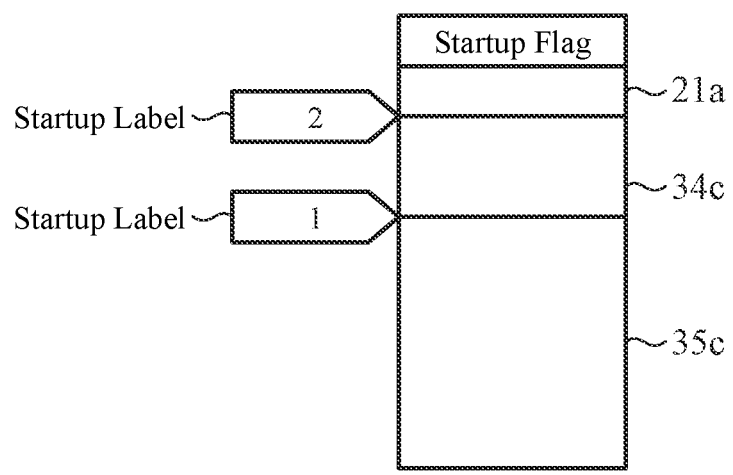
FIG. 10B is a diagram illustrating another configuration of the memory area of the ROM included in the update target ECU.

FIG. 10A is a diagram illustrating a configuration of a memory area of the ROM 202b included in an update target ECU. FIG. 10B is a diagram illustrating another configuration of the memory area of the ROM 202b included in the update target ECU. In FIGS. 10A and 10B, the update target ECU is assumed to be the ECU 3a.

In FIG. 10A, the ROM 202b includes a memory area 21a, a memory area SW(1), and a memory area SW(2) in addition to a memory area storing a startup flag. The memory area 21a functions as the update data storing unit 33 and stores update data a. The memory area SW(1) includes a memory area 34a and a memory area 35a.

Here, the memory area 34a stores a program for implementing a function of the update unit 34. The memory area 35a stores a program for implementing update target software other than the update unit 34.

The memory area SW(2) includes a memory area 34b and a memory area 35b. The memory area 34b stores a program for implementing a function of the update unit 34, and the memory area 35b stores a program for implementing update target software other than the update unit 34. In FIG. 10A, since a startup label "1" is set at a start address of the memory area SW(1), the processor 201 executes a program stored in the memory area SW(1). That is to say, when the ECU 3a is updated, the program stored in the memory area 34a is executed by the processor 201, and thereby the update unit 34 is starting up.

The update unit 34 updates a program stored in the memory area SW(2) using the update data a read from the memory area 21a. Thereafter, a startup label "2" is set at a start address of the updated memory area SW(2), and then the ECU 3a is reset in order to enable the updated program stored in the memory area SW(2). That is to say, operation of the ECU 3a is ended and the ECU 3a is restarted. At this time, the number of times of end of the ECU 3a is one, and the number of times of startup of the ECU 3a is one. When the ECU 3a restarts, the program stored in the memory area 34b is executed by the processor 201, and thereby the update unit 34 starts up.

Meanwhile, the ROM 202b illustrated in FIG. 10B includes a memory area 21a, a memory area 34c, and a memory area 35c in addition to a memory area storing a startup flag. The memory area 21a functions as the update data storing unit 33 and stores update data a. The memory area 34c stores a program for implementing a function of the update unit 34, and the memory area 35c stores a program for implementing update target software other than the update unit 34.

Since a startup label "1" is set at a start address of the memory area 35c, the processor 201 executes the program stored in the memory area 35c. That is to say, when the ECU 3a is updated, a program other than the update unit 34 is executed by the processor 201. Therefore, a startup label "2" is set at a start address of the memory area 34c, and then the ECU 3a is reset. As a result, operation of the ECU 3a is ended and the ECU 3a is restarted. Resetting the ECU 3a causes the update unit 34 to start up.

Next, the update unit 34 updates the program stored in the memory area 35c using the update data a read from the memory area 21a. Thereafter, a startup label "1" is set at a start address of the updated memory area 35c, and then the ECU 3a is reset in order to enable the updated program stored in the memory area 35c. As a result, operation of the ECU 3a is ended and the ECU 3a is restarted. As a result, the program stored in the memory area 35c starts up. When a program stored in the ROM 202b having a configuration of a memory area illustrated in FIG. 10B is updated in this way, the number of times of startup of the ECU 3a is two, and the number of times of end of the ECU 3a is two.

The second communication unit 20b included in the vehicle exterior communication unit 20 acquires stop time b (step ST4a). For example, the second communication unit 20b receives the stop time b from a roadside wireless communication device disposed at a traffic light or a railroad crossing. Note that the stop time b is time during which a red signal of the traffic light is turned on or time during which a crossing gate at the railroad crossing is descending, and is time from when the vehicle temporarily stops due to turning on of the red signal of the traffic light or descent of the crossing gate at the railroad crossing until the vehicle starts traveling. The stop time b acquired by the second communication unit 20b is output to the updatability determining unit 27.

By comparing the stop time b input from the second communication unit 20b with the update time i calculated by the update time calculating unit 26 (step ST5a), the updatability determining unit 27 determines whether or not the stop time b is longer than the update time i (step ST6a). If it is determined that the stop time b is equal to or shorter than the update time i (step ST6a; NO), or if any one of the ECUs having dependency with the update target ECU has given a response indicating that an update cannot be executed as a result of an inquiry from the dependency confirming unit 24 (step ST2a; NO), the updatability determining unit 27 determines that an update of the update target ECU cannot be executed (step ST7a). Thereafter, the process of FIG. 6 is ended.

Meanwhile, if it is determined that the stop time b is longer than the update time i (step ST6a; YES), the updatability determining unit 27 determines that an update of the update target ECU can be executed (step ST8a). Thereafter, the updatability determining unit 27 transmits update request j to the update target ECU so as to execute an update, using the in-vehicle communication unit 28, and ends the process of FIG. 6.

Next, details of an update process in an ECU will be described.

Figure 11:
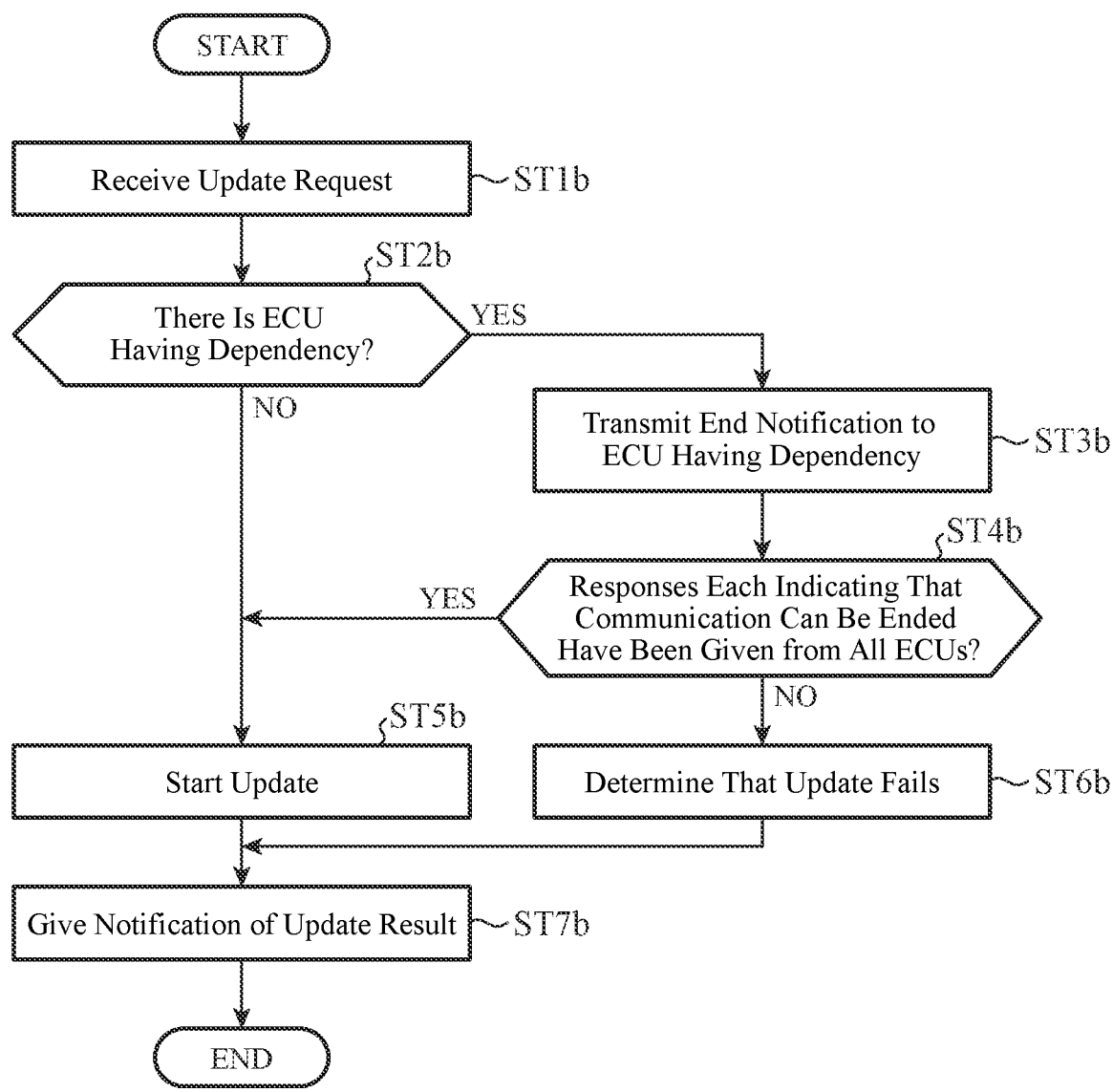
FIG. 11 is a flowchart illustrating a process of updating an update target ECU in the first embodiment.
Figure 12:
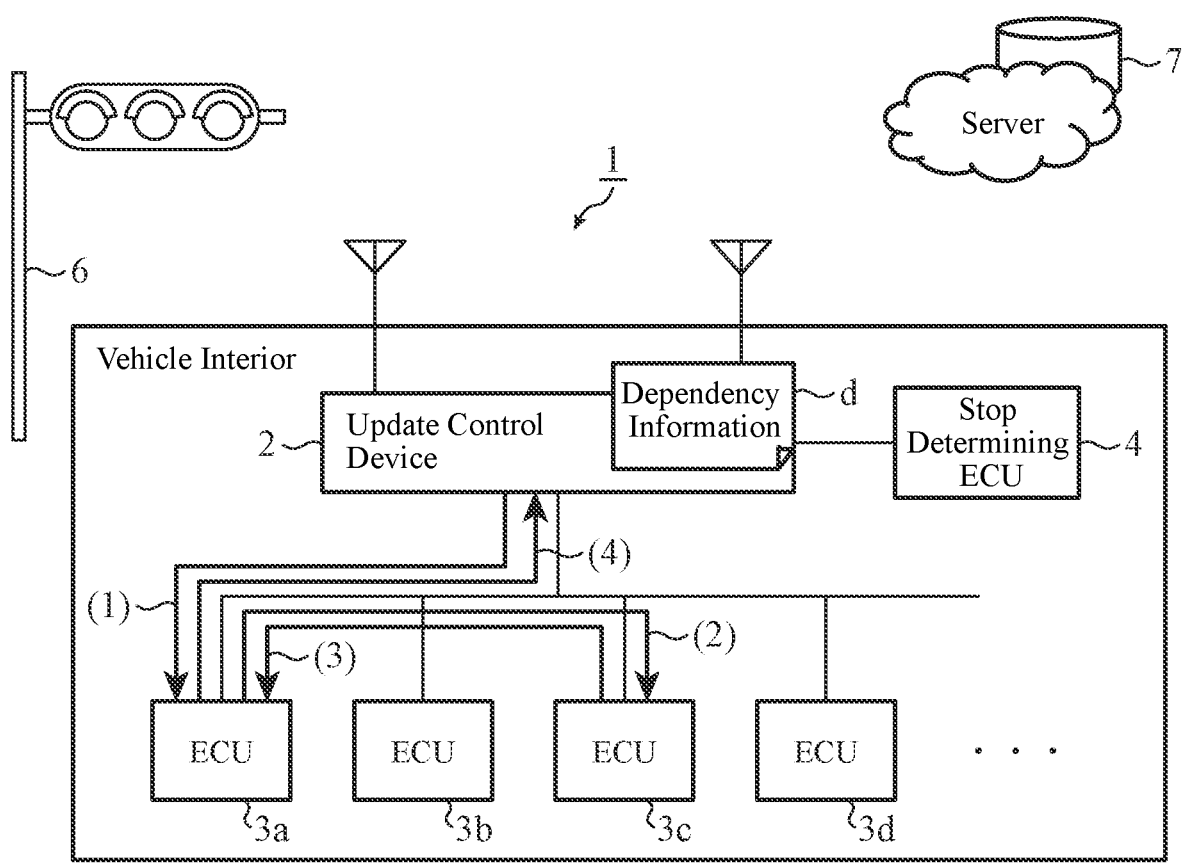
FIG. 12 is an explanatory diagram illustrating a process from an end of communication between ECUs to notification of an update result in the first embodiment.

FIG. 11 is a flowchart illustrating a process of updating an update target ECU in the first embodiment. FIG. 12 is an explanatory diagram illustrating a process from an end of communication between ECUs to notification of an update result. Hereinafter, description will be made by assuming that among the ECUs 3a to 3d connected to the update control device 2, the ECU 3a is an update target, and the ECU 3c has dependency with the ECU 3a.

The updatability determining unit 27 included in the update control device 2 transmits update request j to the update target ECU 3a so as to execute an update, using the in-vehicle communication unit 28 (information communication process (1) illustrated in FIG. 12). The in-vehicle communication unit 30 included in the ECU 3a receives the update request j from the update control device 2 (step ST1b). The update request j received by the in-vehicle communication unit 30 is output to the update unit 34. When the update unit 34 receives input of the update request j, the update unit 34 outputs communication end request 1 to the end confirming unit 32.

When the end confirming unit 32 included in the ECU 3a receives input of the communication end request 1 from the update unit 34, the end confirming unit 32 confirms whether or not there is an ECU having dependency with the update target ECU 3a among the ECUs 3b to 3d connected to the update control device 2 (step ST2b).

For example, the end confirming unit 32 confirms whether or not there is dependency between the ECU 3a and a different ECU on the basis of a communication state between the ECU 3a and the different ECU.

Note that when the update request j is received from the update control device 2, if the communication state of the ECU 3a is the communication state (A) (not communicating with an ECU), the process of step ST3b may be omitted.

Here, if there is an ECU having dependency with the update target ECU 3a (step ST2b; YES), the end confirming unit 32 transmits communication end notification m to the ECU having dependency with the update target ECU 3a using the in-vehicle communication unit 30 in order to confirm whether or not there is a problem even if the update target ECU 3a is shut down at the current point in time (step ST3b). In the example of FIG. 12, communication end notification m is transmitted from the ECU 3a to the ECU 3c (information communication process (2) in FIG. 12).

The end confirming unit 32 included in the ECU 3c controls, when the in-vehicle communication unit 30 thereof receives the communication end notification m, the in-vehicle communication unit 30 in such a manner that the communication state with the ECU 3a transitions to the above-described communication state (A) (not communicating). For example, when the ECU 3c and the ECU 3a are communicating with each other in the communication state (B) (periodic communication), a timer for periodic communication is stopped, and thereby the communication with the ECU 3a is interrupted. When the communication end notification m from the ECU 3a is received, the end confirming unit 32 included in the ECU 3c may control the in-vehicle communication unit 30 in such a manner that communication with the ECU 3a is not performed until an update of the ECU 3a is completed.

When the communication state with the update target ECU 3a has transitioned to a communication state that does not cause a problem even if the communication with the update target ECU 3a is ended, the end confirming unit 32 included in the ECU 3c transmits response information n indicating that the communication with the update target ECU 3a can be ended to the update target ECU 3a using the in-vehicle communication unit 30 (information communication process (3) in FIG. 12).

The end confirming unit 32 included in the update target ECU 3a confirms whether or not responses have been given from all the ECUs having dependency with the ECU 3a (step ST4b). Here, the end confirming unit 32 confirms whether or not response information n indicating that the communication with the ECU 3a can be ended has been received from all the ECUs having dependency. The end confirming unit 32 outputs information o indicating the content of the response information n to the update unit 34. The update unit 34 determines whether or not the response information n indicating that the communication with the update target ECU 3a can be ended has been received on the basis of the information o transmitted from the end confirming unit 32.

If the response information n indicating that the communication with the ECU 3a can be ended has been received from all the ECUs having dependency (step ST4b; YES), or if there is no ECU having dependency with the update target ECU (step ST2b; NO), the update unit 34 starts an update (step ST5b). As a result, an update of the firmware or software included in the ECU 3a is started.

Meanwhile, if response information n indicating that the communication with the ECU 3a cannot be ended is received from any one of the ECUs having dependency (step ST4b; NO), the update unit 34 determines that an update fails (step ST6b).

When the process of step ST5b or the process of step ST6b is completed, the update unit 34 notifies the update control device 2 of an update result (step ST7b). For example, the update unit 34 transmits update result information k indicating a result of the update process to the update control device 2 using the in-vehicle communication unit 30 (information communication process (4) in FIG. 12).

Next, details of a process of downloading update data will be described.

Figure 13:
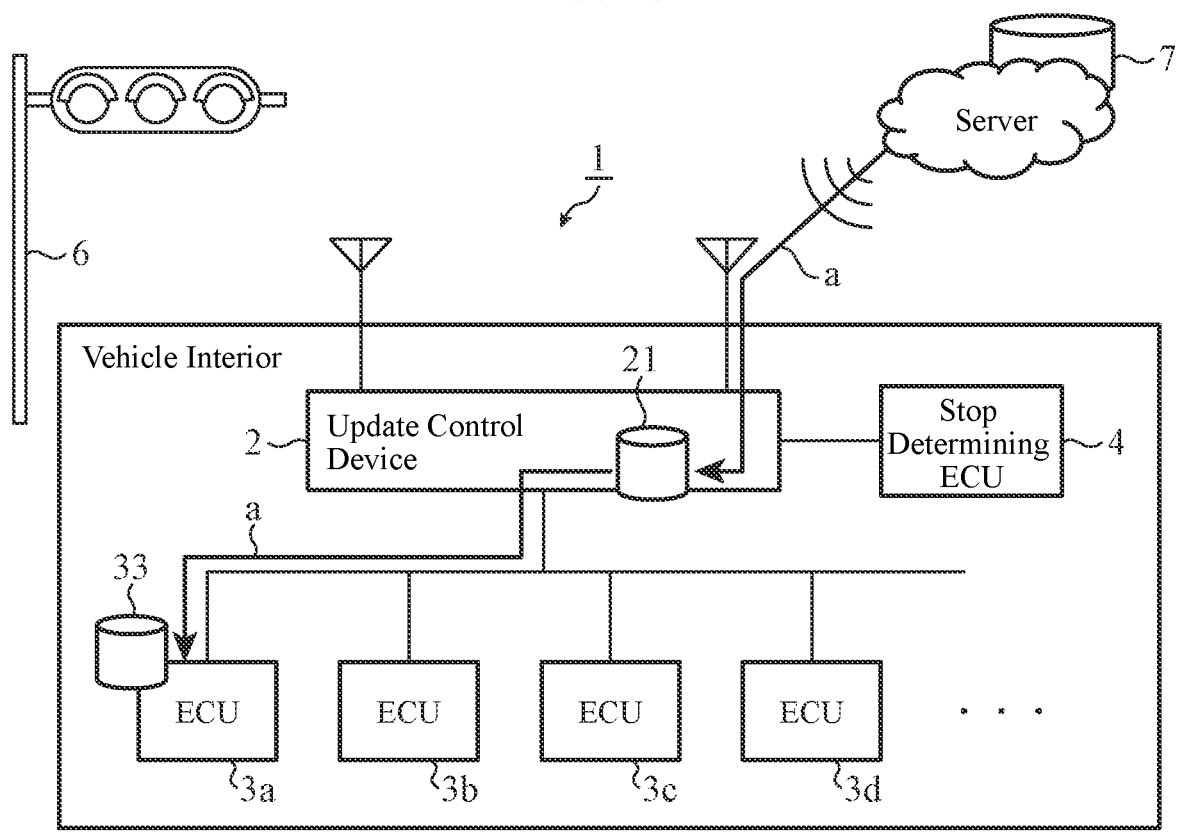
FIG. 13 is an explanatory diagram illustrating a process of downloading update data in the first embodiment.

FIG. 13 is an explanatory diagram illustrating a process of downloading update data in the first embodiment.

The first communication unit 20a included in the update control device 2 downloads update data a from the server 7 for managing the update data using mobile data communication while the vehicle is traveling. The update data a downloaded by the first communication unit 20a is temporarily stored in the update data storing unit 21 included in the update control device 2 as illustrated in FIG. 13.

A reason why the update data a is temporarily stored in the update data storing unit 21 is that wireless communication between the server 7 and the first communication unit 20a is more unstable than wired communication, and furthermore, when a plurality of ECUs is update targets, the data size of the update data a is large in response thereto, and thus it is necessary to temporarily store the data.

When download of the update data a by the first communication unit 20a is completed, the data size is imparted to the update data a stored in the update data storing unit 21, and the update data a is transmitted to an update target ECU by the in-vehicle communication unit 28. In FIG. 13, the update target ECU is the ECU 3a.

When the in-vehicle communication unit 30 included in the ECU 3a receives the update data a, the in-vehicle communication unit 30 stores the update data a in the update data storing unit 33. The update unit 34 updates firmware or software included in the ECU 3a using the update data a stored in the update data storing unit 33.

As described above, when a response indicating that an update can be executed is given from an ECU having dependency with an update target ECU, the update control device 2 according to the first embodiment determines whether or not the update of the update target ECU is to be completed within stop time b from when a vehicle temporarily stops until the vehicle starts traveling.

For example, when it is determined that the update of the ECU is to be completed within stop time b from when the vehicle stops due to a red signal of a traffic light or descent of a crossing gate at a railroad crossing until the vehicle starts traveling, the update of the ECU is executed. As a result, the ECU can be updated without intentionally parking the vehicle.

In the update control device 2 according to the first embodiment, the second communication unit 20b acquires the stop time b from an external device. For example, the second communication unit 20b acquires time during which a red signal of a traffic light is turned on or time during which a crossing gate at a railroad crossing is descending as the stop time b. As a result, the update control device 2 can obtain accurate stop time at the traffic light or the railroad crossing.

The update control device 2 according to the first embodiment includes the dependency storing unit 23 for storing the dependency information d indicating dependency between ECUs. The dependency confirming unit 24 inquires of an ECU whose dependency with an update target ECU has been confirmed on the basis of the dependency information d stored in the dependency storing unit 23 whether or not an update of the update target ECU can be executed. As a result, the update control device 2 can accurately recognize an ECU having dependency with the update target ECU and can inquire of the ECU having dependency with the update target ECU whether or not an update of the update target ECU can be executed.

In the update control device 2 according to the first embodiment, the update time calculating unit 26 calculates update time i on the basis of a time required for shutting down, starting up, and memory rewriting of the update target ECU. As a result, the update control device 2 can calculate accurate update time i.

The update control system 1 according to the first embodiment has a configuration illustrated in FIG. 1 and therefore can update an ECU without intentionally parking a vehicle.

In the update control method according to the first embodiment, since a series of processes illustrated in FIG. 6 is executed, an ECU can be updated without intentionally parking a vehicle similarly to the above.

Second Embodiment

In a second embodiment, when a plurality of ECUs is update targets, update order is determined depending on update priority, and the update is performed for each of the ECUs in the determined order. When an update of one ECU is completed and updates of the other ECUs are not executed, updatability determination is executed for an update having a high priority. The priority is a value imparted depending on urgency of an update. As an update has a higher priority, the update is more urgent and needs to be dealt with more quickly.

Note that configurations of an update control device according to the second embodiment and an update control system according to the second embodiment are the same as those of the first embodiment. Therefore, in the following description, FIGS. 1, 2 and 3 will be referred to for components of the second embodiment.

Figure 14:
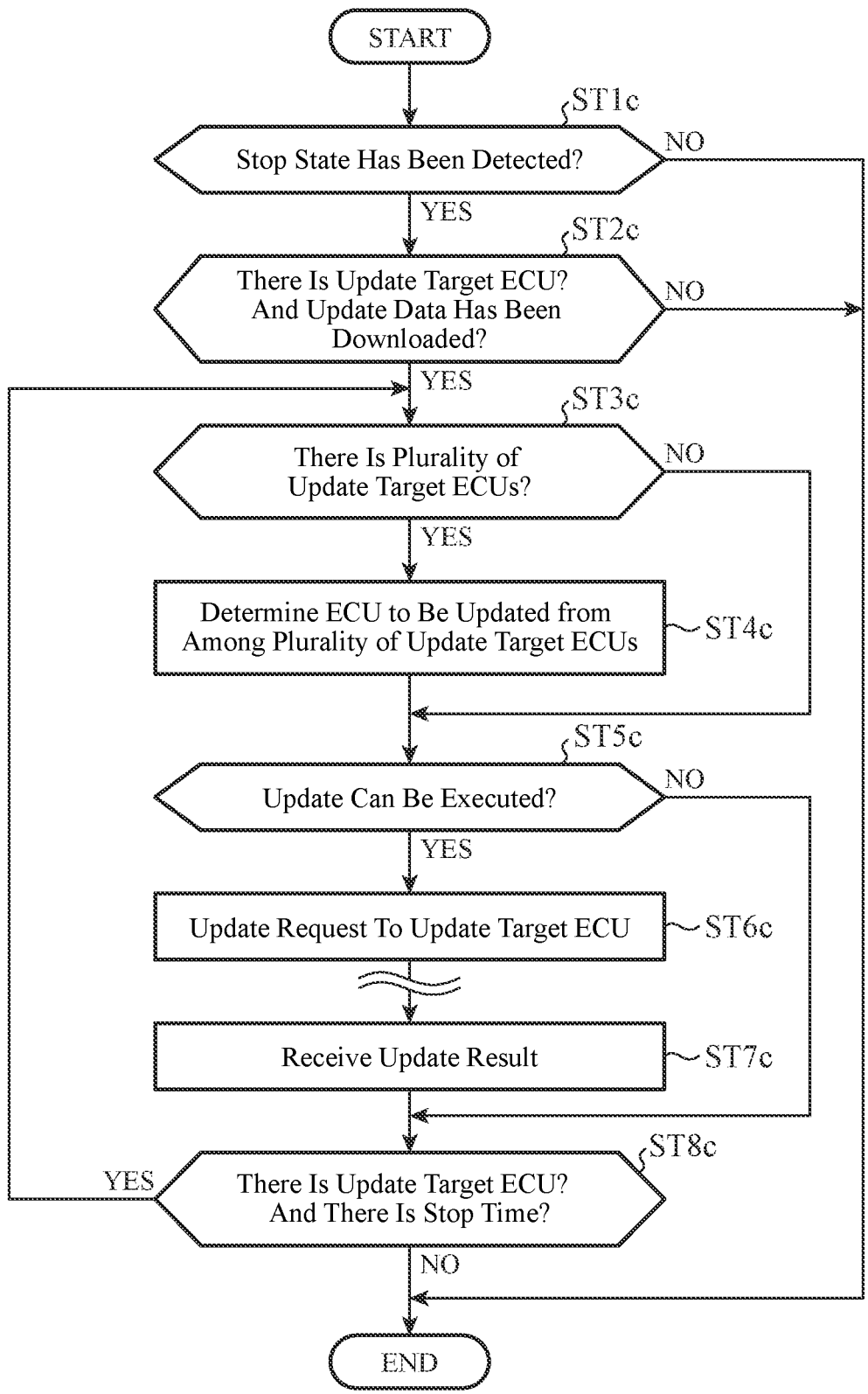
FIG. 14 is a flowchart illustrating an update control method according to a second embodiment of the present invention.

FIG. 14 is a flowchart illustrating an update control method according to the second embodiment of the present invention.

Hereinafter, it is assumed that all of the ECUs 3a to 3d are update target ECUs. Furthermore, it is assumed that a vehicle temporarily stops due to turning on of a red signal of a traffic light or descent of a crossing gate at a railroad crossing before a process of FIG. 14 is executed. At this time, the stop determining ECU 4 determines that the vehicle is in a stop state, and transmits a stop state notification c to the update control device 2.

The stop state detecting unit 22 confirms whether or not the stop state of the vehicle has been detected on the basis of whether or not a stop state notification c has been received from the stop determining ECU 4 (step ST1c).

If a stop state notification c has not been received and thus the stop state of the vehicle has not been detected (step ST1c; NO), the process of FIG. 14 is ended. Note that a series of processes illustrated in FIG. 14 is executed periodically while the update control device 2 is activated.

If a stop state notification c has been received and thus the stop state of the vehicle has been detected (step ST1c; YES), the stop state detecting unit 22 outputs the stop state notification c to the dependency confirming unit 24.

The dependency confirming unit 24 confirms whether or not there is an update target ECU among the ECU 3a to 3d connected to the update control device 2 and whether or not update data a has been downloaded (step ST2c). If there is no update target ECU or update data a has not been downloaded (step ST2c; NO), the process of FIG. 14 is ended.

Meanwhile, if there is an update target ECU among the ECU 3a to 3d and update data a has been downloaded (step ST2c; YES), the dependency confirming unit 24 determines whether or not there is a plurality of update target ECUs (step ST3c). Here, if the number of update target ECUs is one (step ST3c; NO), the process proceeds to step ST5c.

If there is a plurality of update target ECUs (step ST3c; YES), the dependency confirming unit 24 notifies the updatability determining unit 27 of the presence of the plurality of update target ECUs. When the updatability determining unit 27 receives the above notification from the dependency confirming unit 24, the updatability determining unit 27 determines an ECU to be updated from among the plurality of update target ECUs (step ST4c). For example, the updatability determining unit 27 extracts priority imparted to each update from the update data a stored in the update data storing unit 21, and determines that an ECU having the highest update priority is an ECU to be updated.

The dependency confirming unit 24 and the updatability determining unit 27 determine whether or not an update of the ECU determined in step ST4c can be executed (step ST5c). Note that this updatability determination is the same as the process described with reference to FIG. 6 in the first embodiment. If the updatability determining unit 27 determines that the update of the update target ECU cannot be executed (step ST5c; NO), the process proceeds to step ST8c.

If the updatability determining unit 27 determines that the update of the update target ECU can be executed (step ST5c; YES), the updatability determining unit 27 transmits update request to the update target ECU so as to execute the update (step ST6c). For example, the updatability determining unit 27 transmits update request j to the update target ECU and transmits the update data a temporarily stored in the update data storing unit 21 to the update target ECU using the in-vehicle communication unit 28.

The update target ECU executes a firmware or software update process using the update data a received from the update control device 2. Then, the update target ECU transmits update result information k indicating whether or not an update is successful to the update control device 2 using the in-vehicle communication unit 30.

The in-vehicle communication unit 28 included in the update control device 2 receives the update result information k from the update target ECU (step ST7c).

The updatability determining unit 27 determines whether or not there is an update target ECU for which an update process has not been executed among the plurality of update target ECUs determined in step ST3c, and whether or not there is time required for completing the update in current stop time b (step ST8c). For example, the updatability determining unit 27 determines whether or not there is an update target ECU for which an update process has not been executed, and whether or not difference time obtained by subtracting time required for the last update (update time i in the last update) from stop time b is longer than a threshold value.

If there is no update target ECU for which an update process has not been executed or there is no stop time b required for completing the update (step ST8c; NO), the process of FIG. 14 is ended. Note that even if it is determined that an update of an ECU having the highest update priority cannot be executed in step ST5c, by performing the determination of step ST8c, it is possible to determine whether or not an update of an ECU can be executed in descending order of update priority.

Meanwhile, if there is an update target ECU for which an update process has not been executed, and there is time required for completing the update in current stop time b (step ST8c; YES), the updatability determining unit 27 returns to step ST3c. Here, for example, the updatability determining unit 27 compares update time i of an ECU having the highest update priority with difference time obtained by subtracting time required for the last update (update time i in the last update) from stop time b. Then, the updatability determining unit 27 determines that an update can be executed when the difference time is longer than the update time i, and determines that an update cannot be executed when the difference time is equal to or shorter than the update time.

As described above, in the update control device 2 according to the second embodiment, when there is a plurality of update target ECUs, the updatability determining unit 27 performs, in order of update priority, determinations each of which is a determination as to whether or not an update of a corresponding one of the update target ECUs is to be completed within stop time. As a result, even if a plurality of updates is requested simultaneously, an important update having a high priority is executed first. Furthermore, it is also possible to execute a plurality of updates within stop time b.

Third Embodiment

In a third embodiment, when a plurality of ECUs is to be updated simultaneously or in update order, by comparing the total time obtained by summing up update times of the plurality of ECUs with stop time, it is determined whether or not an update can be executed. Note that configurations of an update control device according to the third embodiment and an update control system according to the third embodiment are the same as those of the first embodiment. Therefore, in the following description, FIGS. 1, 2 and 3 will be referred to for components of the third embodiment.

Note that when pieces of firmware or pieces of software included in a plurality of ECUs are updated simultaneously or in update order, it is necessary to make update versions thereof consistent.

For example, consider a case where the ECU 3a and the ECU 3c operate with software of the same version. In this case, a version 1.0.0 of software included in the ECU 3a can be updated to a version 2.0.0, and furthermore, a version 1.0.0 of software included in the ECU 3c can be updated to a version 2.0.0. However, it is not possible to update only the version of software included in the ECU 3c to a version 2.0.0 while the version 1.0.0 of software included in the ECU 3a is not updated.

Figure 15:
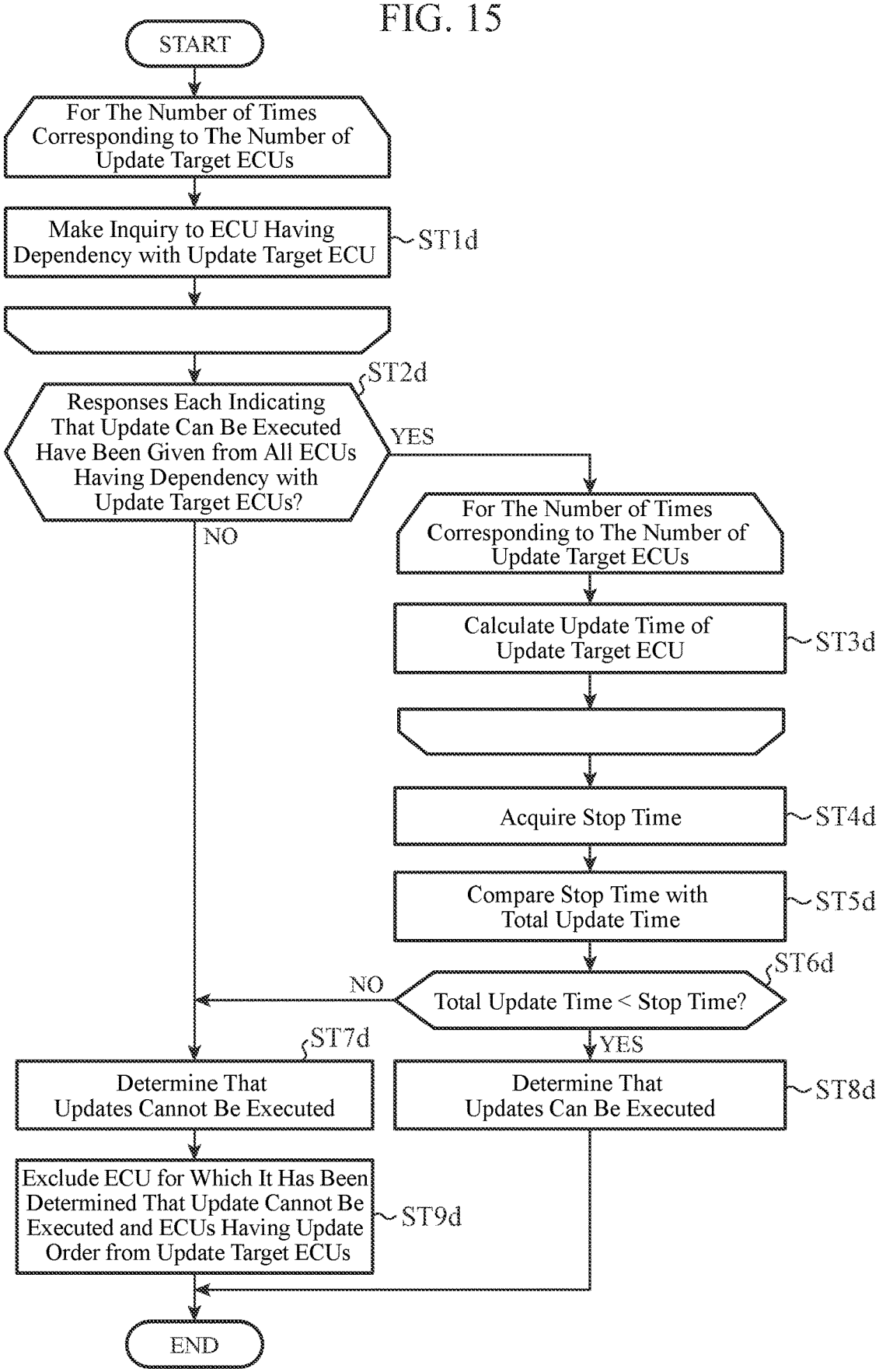
FIG. 15 is a flowchart illustrating an update control method according to a third embodiment of the present invention.

FIG. 15 is a flowchart illustrating an update control method according to the third embodiment of the present invention, and illustrates a series of processes corresponding to the process of step ST5c of FIG. 14.

In a repeated loop for the number of times corresponding to the number of update target ECUs, the dependency confirming unit 24 inquires of an ECU having dependency with any one of the update target ECUs whether or not an update of the update target ECU can be executed (step ST1d). For example, the dependency confirming unit 24 identifies, for each of the update target ECUs, all the ECUs having dependency with the update target ECU on the basis of dependency information d stored in the dependency storing unit 23.

When, for each of the update target ECUs, an inquiry to an ECU having dependency with the update target ECU about whether or not an update can be executed is made, the dependency confirming unit 24 confirms, for each of the update target ECUs, whether or not responses each indicating that an update can be executed have been given from all the ECUs having dependency with the update target ECU on the basis of response information f received from the ECUs having dependency (step ST2d).

For example, when the response information f indicates that an update can be executed, the dependency confirming unit 24 outputs response content information g indicating that an update can be executed to the updatability determining unit 27. Meanwhile, when the response information f indicates that an update cannot be executed, the dependency confirming unit 24 outputs response content information g indicating that an update cannot be executed to the updatability determining unit 27.

If responses each indicating that an update can be executed have been given from all the ECUs having dependency with the update target ECU (step ST2d; YES), the update time calculating unit 26 proceeds to a repeated loop for the number of times corresponding to the number of the update target ECUs. In this repeated loop, the update time calculating unit 26 calculates update time i for each of the update target ECUs (step ST3d). For example, by referring to time information h stored in the time information storing unit 25 and data size a1 of update data a for each update, stored in the update data storing unit 21, the update time calculating unit 26 calculates update time i required for each of updates of the update target ECUs.

The second communication unit 20b included in the vehicle exterior communication unit 20 acquires stop time b (step ST4d). For example, the second communication unit 20b receives the stop time b from a roadside wireless communication device disposed at a traffic light or a railroad crossing. The stop time b acquired by the second communication unit 20b is output to the updatability determining unit 27.

By comparing the stop time b input from the second communication unit 20b with the total time obtained by summing up update times i each of which is calculated for the corresponding update target ECU by the update time calculating unit 26 (step ST5d), the updatability determining unit 27 determines whether or not the stop time b is longer than the total time (step ST6d). If it is determined that the stop time b is equal to or shorter than the total time (step ST6d; NO), or if any one of ECUs having dependency with the update target ECUs has given a response indicating that an update cannot be executed as a result of an inquiry from the dependency confirming unit 24 (step ST2d; NO), the updatability determining unit 27 determines that updates of the update target ECUs cannot be executed (step ST7d).

If it is determined that the stop time b is longer than the total time (step ST6d; YES), the updatability determining unit 27 determines that updates of the update target ECUs can be executed (step ST8d).

Thereafter, the updatability determining unit 27 transmits update request j to the update target ECUs so as to execute updates, using the in-vehicle communication unit 28, and ends the process of FIG. 14.

Meanwhile, if it is determined that updates of the update target ECUs cannot be executed in step ST7d, the updatability determining unit 27 excludes an ECU for which it has been determined that an update cannot be executed and a plurality of ECUs having an update order from the update target ECUs (step ST9d).

In the process of step ST8c of FIG. 14, the updatability determining unit 27 determines an update target ECU that has not been updated regardless of the update order. Therefore, when the process of FIG. 15 is completed and the process returns to the process of FIG. 14, the update order is not considered in step ST8c. For this reason, the updatability determining unit 27 excludes an ECU for which it has been determined that an update cannot be executed and a plurality of ECUs having an update order from the update target ECUs.

Note that the case has been described in which by comparing the total time obtained by summing up update times i each of which is calculated for the corresponding ECU with the stop time b, it is determined whether or not updates of the update target ECUs are to be completed within the stop time b. However, the update control device 2 according to the third embodiment is not limited thereto.

For example, when there is a plurality of update target ECUs and updates thereof are to be performed in parallel, the updatability determining unit 27 may determine whether or not the updates of the plurality of update target ECUs are to be completed within stop time b, by comparing the longest update time i among the update times i calculated for the respective ECUs by the update time calculating unit 26 with the stop time b. As a result, even when a plurality of updates is performed in parallel, the ECUs can be updated without intentionally parking a vehicle.

As described above, in the update control device 2 according to the third embodiment, when there is a plurality of update target ECUs, the updatability determining unit 27 determines whether or not updates of the plurality of update target ECUs are to be completed within stop time b, by calculating the total time of update times i calculated for the respective ECUs by the update time calculating unit 26 and comparing the total time with the stop time b. As a result, even if there is a combination of a plurality of updates, the ECUs can be updated without intentionally parking a vehicle.

Note that the present invention is not limited to the above embodiments, and the embodiments can be freely combined with one another, any component in the embodiments can be modified, or any component in the embodiments can be omitted within the scope of the present invention.

INDUSTRIAL APPLICABILITY

The update control device according to the present invention can update an in-vehicle ECU without intentionally parking a vehicle, and therefore can be used in an update control system for updating the in-vehicle ECU by OTA.

REFERENCE SIGNS LIST

1: Update control system, 2: Update control device, 3a, 3b, 3c, 3d: ECU, 4: Stop determining ECU, 5: Communication bus, 6: Traffic light, 7: Server, 20: Vehicle exterior communication unit, 20a: First communication unit, 20b: Second communication unit, 21, 33: Update data storing unit, 21a, 34a, 34b, 34c, 35a, 35b, 35c: Memory area, 22: Stop state detecting unit, 23: Dependency storing unit, 24: Dependency confirming unit, 25: Time information storing unit, 26: Update time calculating unit, 27: Updatability determining unit, 28, 30: In-vehicle communication unit, 31: Dependency responding unit, 32: End confirming unit, 33: Update data storing unit, 34: Update unit, 100: Vehicle exterior network I/F, 101, 200: In-vehicle network I/F, 102, 201: Processor, 103, 202: Memory, 103a, 202a: RAM, 103b, 202b: ROM

The invention claimed is:
1. An update control device comprising:
a processor to execute a program; and
a memory to store the program which, when executed by the processor, performs processes of,
among a plurality of in-vehicle electronic control units (ECU), inquiring of a dependent in-vehicle ECU having dependency with an update target in-vehicle ECU whether or not an update of the update target in-vehicle ECU can be executed based on a communication state between the dependent in-vehicle ECU and the update target in-vehicle ECU, wherein determining whether or not the update can be executed based on the communication state comprises:
determining that the update can be executed when the communication state between the dependent in-vehicle ECU and the update target in-vehicle ECU corresponds to a first state in which the update target in-vehicle ECU is not currently communicating with dependent in-vehicle ECU, and
determining that the update can be executed when the communication state between the dependent in-vehicle ECU and the update target in-vehicle ECU corresponds to a second state in which the update target in-vehicle ECU does not communicate with the dependent in-vehicle ECU except in a periodic communication cycle;
calculating an update time required for updating the update target in-vehicle ECU;

acquiring a stop time from when a vehicle temporarily stops until the vehicle starts traveling; and determining whether or not the update of the update target in-vehicle ECU is to be completed within the stop time by comparing the update time with the stop time when a response indicating that the update can be executed is confirmed.

2. The update control device according to claim 1, wherein the stop time is acquired from an external device.

3. The update control device according to claim 2, wherein time during which a red signal of a traffic light is turned on or time during which a crossing gate at a railroad crossing is descending is acquired as the stop time from the external device.

4. The update control device according to claim 1, wherein
the memory stores dependency information indicating dependency between the plurality of in-vehicle ECUs, and
the processes further include identifying the dependent in-vehicle ECU based on the dependency information stored in the memory.

5. The update control device according to claim 1, wherein the update time is calculated on a basis of a time required for shutting down, starting up, and memory rewriting of the update target in-vehicle ECU.

6. The update control device according to claim 1, wherein when there is a plurality of the update target in-vehicle ECUs, the processes further include performing, in order of update priority, determinations of each of which is a determination as to whether or not an update of a corresponding one of the update target in-vehicle ECUs is to be completed within the stop time.

7. The update control device according to claim 1, wherein when there is a plurality of the update target in-vehicle ECUs, the processes further include determining whether or not updates of the respective plurality of update target in-vehicle ECUs are to be completed within the stop time, by calculating a total time of update times calculated for the respective in-vehicle ECUs and comparing the total time with the stop time.

8. The update control device according to claim 1, wherein when there is a plurality of the update target in-vehicle ECUs and updates thereof are to be performed in parallel, the processes further include determining whether or not the updates of the respective plurality of update target in-vehicle ECUs are to be completed within the stop time, by comparing a longest update time among update times calculated for the respective in-vehicle ECUs with the stop time.

9. An update control system comprising:
the update control device according to claim 1; and
each of the plurality of in-vehicle ECUs includes: a processor to execute a program; and a memory to store the program which, when executed by the processor, performs a process of responding to an inquiry about whether or not an update can be executed.

10. The update control device according to claim 1, further comprising:
determining that the update cannot be executed when the communication state between the dependent ECU and the update target in-vehicle ECU corresponds to a third state in which the update target in-vehicle ECU is currently communicating with the dependent in-vehicle ECU.

11. An update control method comprising:
among a plurality of in-vehicle electronic control units (ECU), inquiring, by a processor, a dependent in-vehicle ECU having dependency with an update target in-vehicle ECU whether or not an update of the update target in-vehicle ECU can be executed based on a communication state between the dependent in-vehicle ECU and the update target in-vehicle ECU, wherein determining whether or not the update can be executed based on the communication state comprising:
determining that the update can be executed when the communication state between the dependent in-vehicle ECU and the update target in-vehicle ECU corresponds to a first state in which the update target in-vehicle ECU is not currently communicating with dependent in-vehicle ECU, and
determining that the update can be executed when the communication state between the dependent in-vehicle ECU and the update target in-vehicle ECU corresponds to a second state in which the update target in-vehicle ECU does not communicate with the dependent in-vehicle ECU except in a periodic communication cycle;
calculating, by the processor, an update time required for updating the update target in-vehicle ECU;
acquiring, by the processor, a stop time from when a vehicle temporarily stops until the vehicle starts traveling; and
determining, by the processor, whether or not the update of the update target in-vehicle ECU is to be completed within the stop time by comparing the update time with the stop time when a response indicating that the update can be executed is confirmed.

* * * * *